US012804730B2

(12) United States Patent
Abotabl et al.

(10) Patent No.: US 12,804,730 B2
(45) Date of Patent: Nov. 17, 2026

(54) RANDOM ACCESS CHANNEL OCCASION CONFIGURATION FOR ON-DEMAND SYNCHRONIZATION SIGNAL BLOCKS

(71) Applicant: QUALCOMM Incorporated, San Diego, CA (US)

(72) Inventors: Ahmed Attia Abotabl, San Diego, CA (US); Diana Maamari, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 18/481,970

(22) Filed: Oct. 5, 2023

(65) Prior Publication Data

US 2025/0119957 A1 Apr. 10, 2025

(51) Int. Cl.
*H04W 74/08* (2024.01)
*H04W 74/0833* (2024.01)

(52) U.S. Cl.
CPC ... *H04W 74/0891* (2013.01); *H04W 74/0841* (2013.01)

(58) Field of Classification Search
CPC ............. H04W 74/004; H04W 74/006; H04W 74/0833; H04W 74/0841; H04W 74/0891
See application file for complete search history.

(56) References Cited

U.S. PATENT DOCUMENTS 11,153,912 B2 10/2021 Agiwal
2019/0313260 A1* 10/2019 Zhang ............... H04W 74/0833
(Continued)

OTHER PUBLICATIONS

Huawei, et al., "Discussion on RA Procedure for msg1-based On-demand SI Request", 3GPP TSG-RAN WG2 Meeting AH1807, R2-1810002, 3rd Generation Partnership Project, Mobile Competence Centre, 650, Route Des Lucioles, F-06921 Sophia-Antipolis Cedex, vol. RAN WG2, No. Montreal, Canada, Jul. 2, 2018-Jul. 6, 2018, Jun. 22, 2018, 9 pages, XP051525822, subclause 1 Introduction, 2.1 RA resource configuration for on-demand SI request, subclause 2.2 RA resource selection for on-demand SI request.
(Continued)

*Primary Examiner* — Kashif Siddiqui
(74) *Attorney, Agent, or Firm* — QUALCOMM Incorporated

(57) ABSTRACT

Methods, systems, and devices for wireless communications are described. To save energy at the network, synchronization signal blocks (SSBs) may be transmitted in an on-demand manner. For example, the network may transmit an SSB in response to a request for an SSB or an uplink wake-up signal (WUS) from a user equipment (UE). SSBs may be mapped to corresponding random access channel occasions (ROs) via control signaling such as radio resource control or system information. For example, the described techniques provide for rules and/or signaling that may indicate whether a network entity should monitor for, and thus whether a UE may transmit, in ROs corresponding to on-demand SSBs. In some examples, a UE may transmit a request for an on-demand SSB, receive an SSB based on the request, and selectively transmit a message to the network entity in an RO corresponding to the SSB based on reception of the SSB.

30 Claims, 16 Drawing Sheets

(56) References Cited

U.S. PATENT DOCUMENTS

| | | | | |
|---|---|---|---|---|
| 2020/0053796 | A1* | 2/2020 | Agiwal | H04W 48/14 |
| 2020/0221506 | A1* | 7/2020 | Jeon | H04W 74/0808 |
| 2021/0112602 | A1* | 4/2021 | Li | H04W 74/0833 |
| 2022/0167427 | A1* | 5/2022 | Ko | H04W 72/23 |
| 2022/0167431 | A1* | 5/2022 | Agiwal | H04W 28/06 |
| 2022/0322445 | A1* | 10/2022 | Kaikkonen | H04W 74/0833 |
| 2024/0244521 | A1* | 7/2024 | Yi | H04W 52/0235 |
| 2025/0112715 | A1* | 4/2025 | Cheng | H04B 17/327 |
| 2025/0212261 | A1* | 6/2025 | Shi | H04L 5/0048 |

OTHER PUBLICATIONS

International Search Report and Written Opinion—PCT/US2024/047079—ISA/EPO—Dec. 18, 2024.

LG Electronics: "Discussion on Physical Layer Techniques for Network Energy Savings", 3GPP TSG RAN WG1 #111, R1-2212302, 3rd Generation Partnership Project, Mobile Competence Centre, 650, Route Des Lucioles, F-06921 Sophia-Antipolis Cedex, France, vol. RAN WG1, No. Toulouse, FR, Nov. 14, 2022-Nov. 18, 2022, 23 pages, Nov. 7, 2022, XP052222860, Subclause 2.1.3 Technique #A-3: Wake up of gNB Triggered by UE wake up signal (WUS).

* cited by examiner

RANDOM ACCESS CHANNEL OCCASION CONFIGURATION FOR ON-DEMAND SYNCHRONIZATION SIGNAL BLOCKS

FIELD OF TECHNOLOGY

The following relates to wireless communications, including random access channel occasion configuration for on-demand synchronization signal blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support random access channel (RACH) occasion (RO) configuration for on-demand synchronization signal blocks (SSBs). For example, the described techniques provide for rules and/or signaling that may indicate whether a network entity should monitor for, and thus whether a user equipment (UE) may transmit, in ROs corresponding to on-demand SSBs. In some examples, to save energy at the network, SSBs may be transmitted in an on-demand manner. For example, the network may transmit an SSB in response to a request for an SSB or an uplink wake-up signal (WUS) from a UE. SSBs may be mapped to corresponding ROs via control signaling such as radio resource control (RRC) or system information (SI). In some examples, a UE may transmit a request for an on-demand SSB, receive an SSB based on the request, and selectively transmit a message to the network entity in an RO corresponding to the SSB based on reception of the SSB. In some examples, a UE may be allowed to transmit a message in an RO even if no SSB corresponding to the RO was transmitted. In some examples, a UE may be allowed to transmit in an RO if an SSB corresponding to the RO was transmitted. In some examples, separate mappings may be provided between on-demand SSBs and ROs and legacy SSBs (e.g., periodically scheduled unsolicited or unprompted SSBs) and ROs. In some examples, the network entity may dynamically indicate a corresponding RO for a requested SSB in response to the request for the SSB (e.g., via downlink control information (DCI)).

A method for wireless communications by a user equipment (UE) is described. The method may include transmitting, to a network entity, a request for a SSB, receiving, from the network entity and in response to the request, the SSB, and selectively transmitting, to the network entity and based on reception of the SSB, a message in a RO, where the RO is associated with the SSB.

A UE for wireless communications is described. The UE may include one or more memories storing processor executable code, and one or more processors coupled with the one or more memories. The one or more processors may individually or collectively operable to execute the code to cause the UE to transmit, to a network entity, a request for a SSB, receive, from the network entity and in response to the request, the SSB, and selectively transmit, to the network entity and based on reception of the SSB, a message in a RO, where the RO is associated with the SSB.

Another UE for wireless communications is described. The UE may include means for transmitting, to a network entity, a request for a SSB, means for receiving, from the network entity and in response to the request, the SSB, and means for selectively transmitting, to the network entity and based on reception of the SSB, a message in a RO, where the RO is associated with the SSB.

A non-transitory computer-readable medium storing code for wireless communications is described. The code may include instructions executable by a processor to transmit, to a network entity, a request for a SSB, receive, from the network entity and in response to the request, the SSB, and selectively transmit, to the network entity and based on reception of the SSB, a message in a RO, where the RO is associated with the SSB.

Some examples of the method, UEs, and non-transitory computer-readable medium described herein may further include operations, features, means, or instructions for receiving, from the network entity, control signaling indicating a first mapping between a first set of SSBs and a first set of ROs, where the first set of SSBs includes the SSB, where the first set of ROs includes the RO, and where the first mapping indicates that the RO may be associated with the SSB.

In some examples of the method, UEs, and non-transitory computer-readable medium described herein, selectively refraining from transmitting a second message in a second RO of the first set of ROs associated with a second SSB of the first set of SSBs based on a determination that the second SSB was not received, where the first mapping indicates that the second RO may be associated with the SSB.

In some examples of the method, UEs, and non-transitory computer-readable medium described herein, selectively transmitting a second message in a second RO of the first set of ROs associated with a second SSB of the first set of SSBs that was not received based on the control signaling indicating that the first set of SSBs may be on-demand SSBs, where the first mapping indicates that the second RO may be associated with the SSB.

Some examples of the method, UEs, and non-transitory computer-readable medium described herein may further include operations, features, means, or instructions for receiving, with the control signaling, an indication of a second mapping between a second set of SSBs and a second set of ROs, where the control signaling indicates that the first set of SSBs may be on-demand SSBs, and where the control signaling indicates that the second set of SSBs may be un-solicited.

In some examples of the method, UEs, and non-transitory computer-readable medium described herein, a first maximum duration between any SSB of the first set of SSBs and an associated RO of the first set of ROs in accordance with the first mapping may be less than a second maximum duration between any SSB of the second set of SSBs and an associated RO of the second set of ROs in accordance with the second mapping.

In some examples of the method, UEs, and non-transitory computer-readable medium described herein, receiving the control signaling may include operations, features, means, or instructions for receiving the control signaling via an RRC message while in an RRC connected mode with the network entity.

In some examples of the method, UEs, and non-transitory computer-readable medium described herein, receiving the control signaling may include operations, features, means, or instructions for receiving the control signaling via SI.

Some examples of the method, UEs, and non-transitory computer-readable medium described herein may further include operations, features, means, or instructions for receiving, from the network entity in response to the request, control signaling indicating the RO associated with the SSB.

Some examples of the method, UEs, and non-transitory computer-readable medium described herein may further include operations, features, means, or instructions for receiving, with the control signaling, an indication of a set of preambles associated with the RO, where transmitting the message includes transmitting one of the set of preambles.

In some examples of the method, UEs, and non-transitory computer-readable medium described herein, receiving the control signaling may include operations, features, means, or instructions for receiving a DCI via a downlink control channel monitoring occasion associated with the SSB.

Some examples of the method, UEs, and non-transitory computer-readable medium described herein may further include operations, features, means, or instructions for receiving a DCI via a downlink control channel monitoring occasion associated with scheduling a downlink shared channel transmission from the network entity.

In some examples of the method, UEs, and non-transitory computer-readable medium described herein, transmitting the request may include operations, features, means, or instructions for transmitting an uplink WUS to the network entity.

A method for wireless communications by a network entity is described. The method may include receiving, from a UE, a request for a SSB, transmitting, to the UE and in response to the request, the SSB, and selectively monitoring, based on transmission of the SSB, for a message from the UE in a RO, where the RO is associated with the SSB.

A network entity for wireless communications is described. The network entity may include one or more memories storing processor executable code, and one or more processors coupled with the one or more memories. The one or more processors may individually or collectively operable to execute the code to cause the network entity to receive, from a UE, a request for a SSB, transmit, to the UE and in response to the request, the SSB, and selectively monitor, based on transmission of the SSB, for a message from the UE in a RO, where the RO is associated with the SSB.

Another network entity for wireless communications is described. The network entity may include means for receiving, from a UE, a request for a SSB, means for transmitting, to the UE and in response to the request, the SSB, and means for selectively monitoring, based on transmission of the SSB, for a message from the UE in a RO, where the RO is associated with the SSB.

A non-transitory computer-readable medium storing code for wireless communications is described. The code may include instructions executable by a processor to receive, from a UE, a request for a SSB, transmit, to the UE and in response to the request, the SSB, and selectively monitor, based on transmission of the SSB, for a message from the UE in a RO, where the RO is associated with the SSB.

Some examples of the method, network entities, and non-transitory computer-readable medium described herein may further include operations, features, means, or instructions for transmitting, to the UE, control signaling indicating a first mapping between a first set of SSBs and a first set of ROs, where the first set of SSBs includes the SSB, where the first set of ROs includes the RO, and where the first mapping indicates that the RO may be associated with the SSB.

In some examples of the method, network entities, and non-transitory computer-readable medium described herein, selectively refraining from monitoring for a second message from the UE in a second RO of the first set of ROs associated with a second SSB of the first set of SSBs based on refraining from transmitting the second SSB, where the first mapping indicates that the second RO may be associated with the SSB.

In some examples of the method, network entities, and non-transitory computer-readable medium described herein, selectively monitoring for a second message in a second RO of the first set of ROs associated with a second SSB of the first set of SSBs that was not transmitted based on the control signaling indicating that the first set of SSBs may be on-demand SSBs, where the first mapping indicates that the second RO may be associated with the SSB.

Some examples of the method, network entities, and non-transitory computer-readable medium described herein may further include operations, features, means, or instructions for transmitting, with the control signaling, an indication of a second mapping between a second set of SSBs and a second set of ROs, where the control signaling indicates that the first set of SSBs may be on-demand SSBs, and where the control signaling indicates that the second set of SSBs may be un-solicited.

In some examples of the method, network entities, and non-transitory computer-readable medium described herein, a first maximum duration between any SSB of the first set of SSBs and an associated RO of the first set of ROs in accordance with the first mapping may be less than a second maximum duration between any SSB of the second set of SSBs and an associated RO of the second set of ROs in accordance with the second mapping.

In some examples of the method, network entities, and non-transitory computer-readable medium described herein, transmitting the control signaling may include operations, features, means, or instructions for transmitting the control signaling via an RRC message while in an RRC connected mode with the network entity.

In some examples of the method, network entities, and non-transitory computer-readable medium described herein, transmitting the control signaling may include operations, features, means, or instructions for transmitting the control signaling via SI.

Some examples of the method, network entities, and non-transitory computer-readable medium described herein may further include operations, features, means, or instructions for transmitting, to the UE in response to the request, control signaling indicating the RO associated with the SSB.

Some examples of the method, network entities, and non-transitory computer-readable medium described herein may further include operations, features, means, or instructions for transmitting, with the control signaling, an indication of a set of preambles associated with the RO, where receiving the message includes receiving one of the set of preambles.

In some examples of the method, network entities, and non-transitory computer-readable medium described herein, transmitting the control signaling may include operations, features, means, or instructions for transmitting a DCI via a downlink control channel monitoring occasion associated with the SSB.

In some examples of the method, network entities, and non-transitory computer-readable medium described herein, transmitting the control signaling may include operations, features, means, or instructions for transmitting a DCI via a downlink control channel monitoring occasion associated with scheduling a downlink shared channel transmission.

In some examples of the method, network entities, and non-transitory computer-readable medium described herein, receiving the request may include operations, features, means, or instructions for receiving an uplink WUS from the UE.

DETAILED DESCRIPTION

Figure 1:
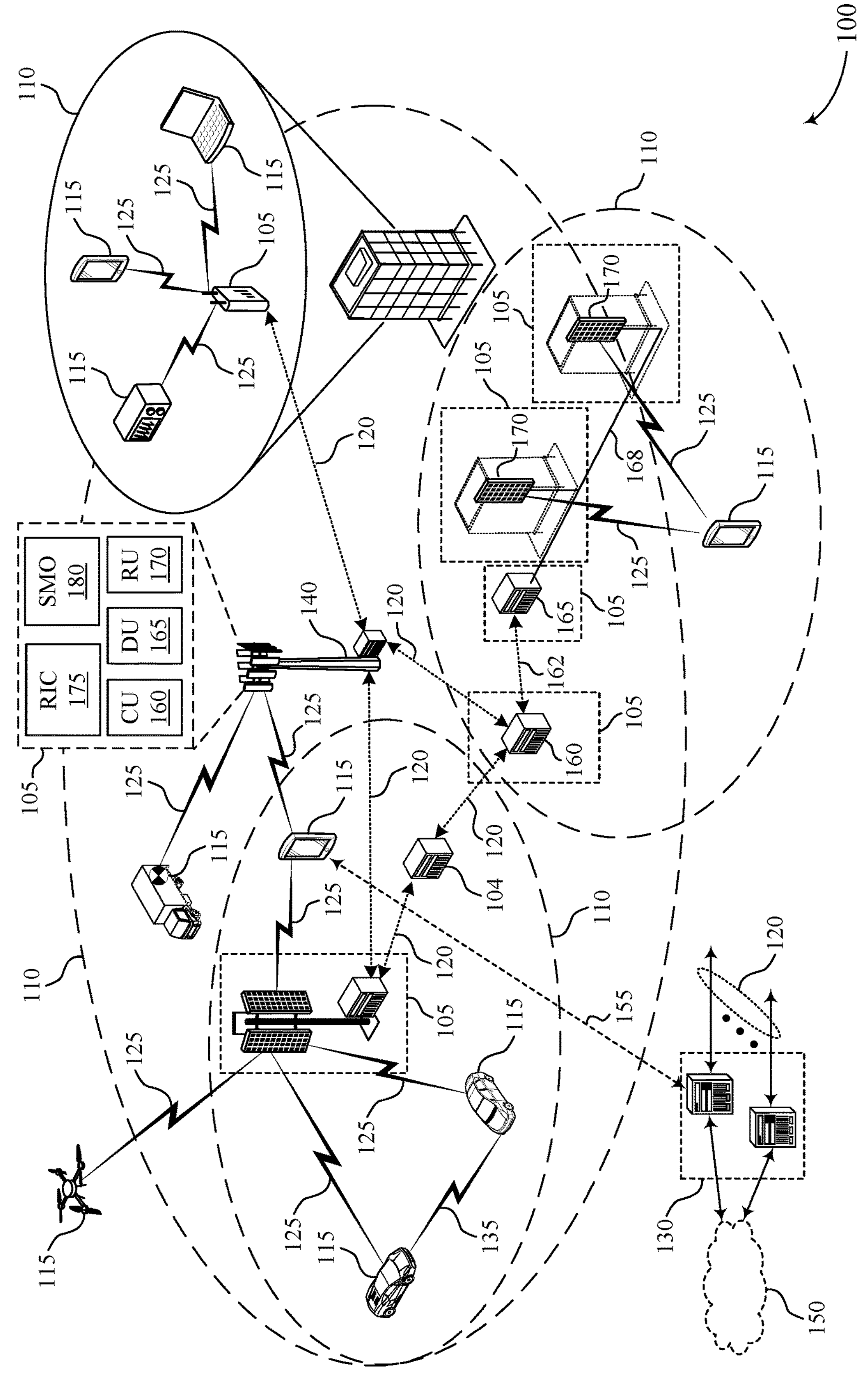
FIG. 1 shows an example of a wireless communications system that supports random access channel (RACH) occasion (RO) configuration for on-demand synchronization signal blocks (SSBs) in accordance with one or more aspects of the present disclosure.

In wireless communications systems, network entities may transmit synchronization signal blocks (SSBs) for purposes such as clock synchronization and beam management. For example, wireless communication systems may support a beamforming procedure between a network entity and a user equipment (UE). In some examples of a beamforming procedure, the network entity may transmit multiple SSB s over multiple beams towards the direction of the UE to form a directional transmission to the UE. The network entity may transmit a set of SSBs periodically. For example, four SSBs occupying four symbols (e.g., time resources) may be transmitted every 20 milliseconds (ms) over each of the beams (e.g., 64 beam directions).

As SSBs are transmitted periodically, SSBs may be a large contributor to network energy consumption. In some examples, to save energy at the network, SSBs may be transmitted in an on-demand manner. For example, the network may transmit an SSB in response to a request for an SSB or an uplink wake-up signal (WUS) from a UE. SSBs may be mapped to corresponding random access channel (RACH) occasions via system information (SI) (e.g., in a system information block (SIB)) or radio resource control (RRC) signaling. For example, based on a measurement of a received SSB satisfying a threshold, a UE may transmit a RACH preamble in a corresponding RACH occasion (RO). An RO may be used for transmitting initial access messages, SI requests, or scheduling requests. For on-demand SSBs, currently there are no rules defining whether the network entity should monitor in ROs corresponding to on-demand SSBs that the network did not transmit.

Aspects of the present disclosure may define whether the network entity should monitor for, and thus whether a UE may transmit, in ROs corresponding to on-demand SSBs. For example, a UE may transmit a request for an on-demand SSB, receive an SSB based on the request, and selectively transmit a message to the network entity in an RO corresponding to the SSB based on reception of the SSB. The network entity may correspondingly monitor an RO based on transmitting an on-demand SSB that corresponds to the RO. In some examples, a UE may be allowed to transmit a message in an RO even if no SSB corresponding to the RO was transmitted. In some examples, a UE may be allowed to transmit in an RO if an SSB corresponding to the RO was transmitted. In some examples, separate mappings may be provided between on-demand SSBs and ROs and legacy SSBs (e.g., periodically scheduled unsolicited or unprompted SSBs) and ROs. In some examples, the network entity may dynamically indicate a corresponding RO for a requested SSB in response to the request for the SSB (e.g., via downlink control information (DCI)).

Aspects of the disclosure are initially described in the context of wireless communications systems. Aspects of the disclosure are further illustrated by and described with reference to resource diagrams, process flows, apparatus diagrams, system diagrams, and flowcharts that relate to RO configuration for on-demand SSBs.

FIG. 1 shows an example of a wireless communications system 100 that supports RO configuration for on-demand SSBs in accordance with one or more aspects of the present disclosure. The wireless communications system 100 may include one or more network entities 105, one or more UEs

115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support RO configuration for on-demand SSBs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a network entity 105 may transmit SSBs for purposes such as clock synchronization and beam management. For example, a network entity 105 and a UE 115 may perform a beamforming procedure using SSBs. In some examples of a beamforming procedure, the network entity 105 may transmit multiple SSBs over multiple beams towards the direction of the UE 115 to form a directional transmission to the UE 115. The network entity 105 may transmit a set of SSBs periodically. For example, four SSBs occupying four symbols (e.g., time resources) may be transmitted every 20 ms over each of the beams (e.g., 64 beam directions).

Network energy consumption may contribute to a high cost to run a cellular network (e.g., 23% of the total expense). A large portion (e.g., 50% in 5G NR) of network energy consumption may be caused by RAN. Network energy saving may be valuable for the expansion of cellular networks. In some examples, network entity energy consumption models may be adapted, including relative energy consumption for downlink and uplink (considering factors such as power amplifier efficiency, quantity of transmit RUs, and network entity load, sleep states and associated transition times, and one or more reference parameters or configurations). In some examples, an energy consumption model evaluation methodology and key performance indicators (KPIs) may be defined. Such evaluation methodology may target for evaluation system-level network energy consumption and energy savings gains, as well as may assess or balance the impact to the network and user performance (e.g., spectral efficiency, capacity, user perceived throughput, latency, handover performance, call drop rate, initial access performance, service level agreement assurance related KPIs), energy efficiency, UE power consumption, and complexity. The evaluation methodology may not focus on a single KPI and may reuse existing KPIs where applicable. New KPIs may be developed for some purposes. Some techniques to improve network energy savings in terms of network entity 105 transmission and reception may include more efficient dynamic or semi-static scheduling of transmissions or receptions, finer granularity of transmissions or receptions, and/or transmissions or receptions in one or more energy savings techniques or modes in time, frequency, spatial, or power domains. Some techniques to improve network energy savings may involve support or feedback from UEs 115 and potential UE assistance information. Some techniques to improve network energy savings may involve information exchange or coordination between network entities 105 over network interfaces. Two techniques that may be adopted to reduce network energy consumption may include: 1) dynamic adaptation of spatial and power domain, and 2) cell discontinuous reception (DRX) and cell discontinuous transmission (DTX).

As SSBs are transmitted periodically, SSBs may be a large contributor to network energy consumption. Thus, network energy consumption may be reduced by implementing on-demand SSBs. By implementing on-demand SSBs, a network entity 105 may save the energy associated with transmission of an SSB when UEs 115 do not demand SSBs. As described herein, SSBs may be mapped to corresponding ROs. Thus, absent rules or signaling indicating whether a UE 115 may transmit in an RO that corresponds to an SSB that was not transmitted (e.g., as no UE 115 requested the SSB), it may be unclear whether the UE 115 may transmit in an RO that corresponds to an SSB that was not transmitted. Similarly, it may be unclear whether a network entity 105 should monitor ROs for RACH messages from UEs 115 in ROs that correspond to SSBs that were not transmitted.

Aspects of the present disclosure may define whether the network entity 105 should monitor for, and thus whether a UE 115 may transmit, in ROs corresponding to on-demand SSBs. For example, a UE 115 may transmit a request for an on-demand SSB, receive an SSB based on the request, and selectively transmit a message to the network entity in an RO corresponding to the SSB based on reception of the SSB. The network entity 105 may correspondingly monitor an RO based on transmitting an on-demand SSB that corresponds to the RO. In some examples, a UE 115 may be allowed to transmit a message in an RO even if no SSB corresponding to the RO was transmitted. In some examples, a UE 115 may be allowed to transmit in an RO if an SSB corresponding to the RO was transmitted. In some examples, separate mappings may be provided between on-demand SSBs and ROs and legacy SSBs (e.g., periodically scheduled unsolicited or unprompted SSBs) and ROs. In some examples, the network entity may dynamically indicate a corresponding RO for a requested SSB in response to the request for the SSB (e.g., via DCI). The use of on-demand SSBs and rules and/or signaling that indicate whether the network entity 105 should monitor for, and thus whether a UE 115 may transmit, in ROs corresponding to on-demand SSBs, may: enable a network entity 105 to sleep for longer durations (e.g., by avoiding waking up to transmit SSBs that are not demanded); enable the network to provide low latency to UEs requesting ROs (e.g., by mapping ROs to demanded SSBs); and enable the network entity 105 to save energy via not transmitting SSBs that are not demanded and/or not monitoring in ROs in which the UE 115 is not expected to transmit a RACH message.

Figure 2:
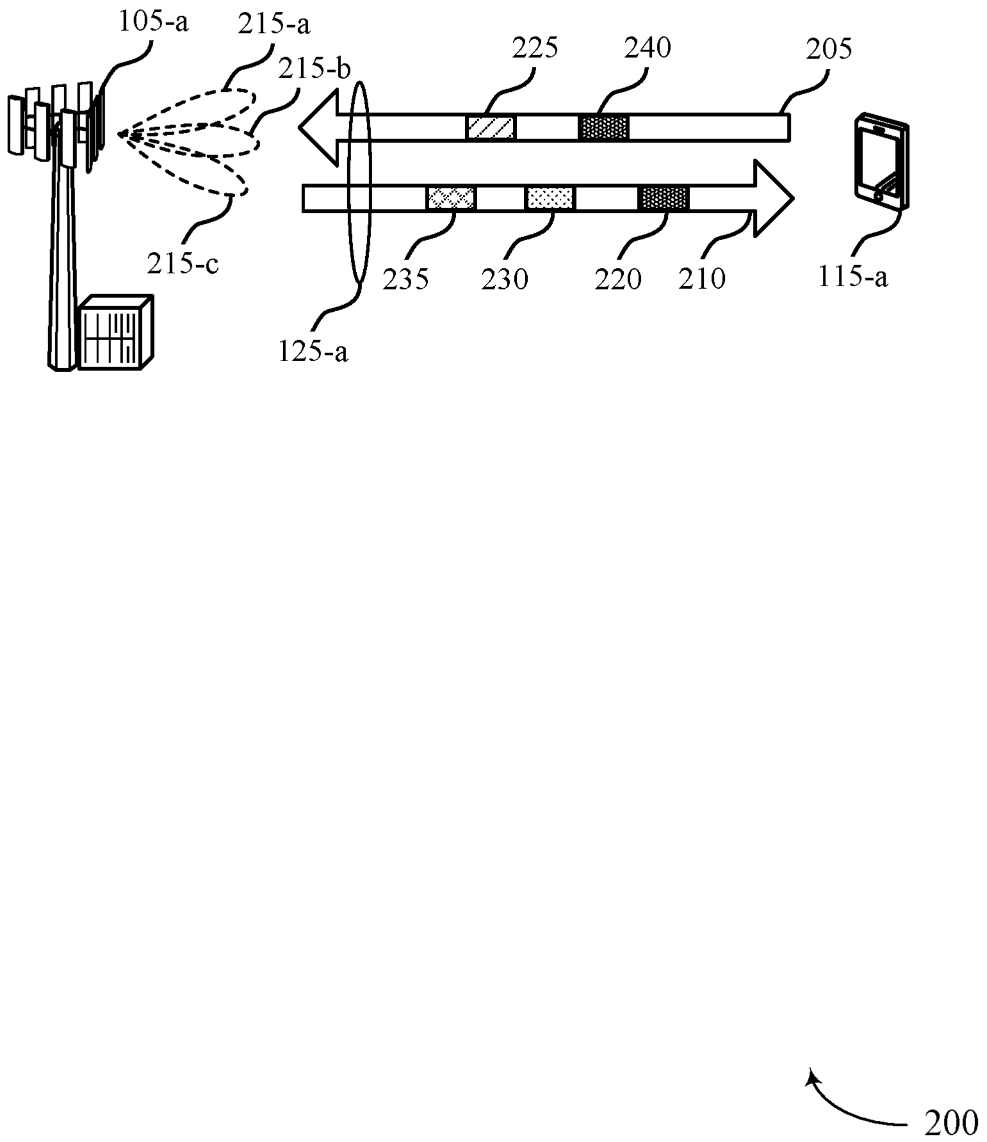
FIG. 2 shows an example of a wireless communications system that supports RO configuration for on-demand SSBs in accordance with one or more aspects of the present disclosure.

FIG. 2 shows an example of a wireless communications system 200 that supports RO configuration for on-demand SSBs in accordance with one or more aspects of the present disclosure. The wireless communications system 200 may implement or may be implemented by aspects of the wireless communications system 100. For example, the wireless communications system 200 may include a UE 115-*a*, which may be an example of a UE 115 as described herein. The wireless communications system 200 may include a network entity 105-*a*, which may be an example of a network entity 105 as described herein.

The UE 115-*a* may communicate with the network entity 105-*a* using a communication link 125-*a*. The communication link 125-*a* may be an example of an NR or LTE link between the UE 115-*a* and the network entity 105-*a*. The communication link 125-*a* may include a bi-directional link that enable both uplink and downlink communications. For example, the UE 115-*a* may transmit uplink signals 205 (e.g., uplink transmissions), such as uplink control signals or uplink data signals, to the network entity 105-*a* using the communication link 125-*a* and the network entity 105-*a* may transmit downlink signals 210 (e.g., downlink transmissions), such as downlink control signals or downlink data signals, to the UE 115-*a* using the communication link 125-*a*.

The network entity 105-*a* may use beamforming techniques to transmit downlink signals 210 to the UE 115-*a*. For example, the network entity 105-*a* may transmit SSBs 230 via beams 215 (e.g., a beam 215-*a*, a beam 215-*b*, and a beam 215-*c* as shown in FIG. 2). As described herein, the network entity 105-*a* may transmit SSBs 230 in an on-demand manner in response to a request 225 from the UE 115-*a*. For example, the UE 115-*a* may transmit a request 225 to the network entity 105-*a* for an SSB 230, for example, for beam management purposes or for clock synchronization purposes. In response to the request 225, the network entity 105-*a* may transmit an SSB 230 (e.g., in the requested configured SSB resource). In some examples, the network entity 105-*a* may transmit control signaling 220 that schedules SSB occasions and ROs and maps SSB occasions to ROs. In such examples, the request 225 may indicate a requested SSB occasion. In some examples, based on reception of the SSB 230, the UE 115-*a* may transmit a RACH message 240 (e.g., a RACH preamble or a MsgA) in the RO that is mapped to the SSB 230, and the network entity 105-*a* may monitor the RO for a RACH message 240 from the UE 115 based on transmitting the SSB 230 in response to the request 225.

In some examples, the UE 115-*a* may be allowed to transmit a RACH message 240 in an RO that corresponds to an SSB 230 that was not transmitted, and accordingly the network entity 105-*a* may monitor for RACH messages in all ROs regardless of whether the network entity 105-*a* transmitted a corresponding SSB. For example, the UE 115-*a* may transmit in an RO even if the corresponding SSB was not transmitted in order to transmit a system information request or a scheduling request to the network entity 105-*a*.

In some examples, for example, as described with reference to FIG. 4, the control signaling 220 may indicate separate mappings between a first set of legacy SSBs (e.g., periodically scheduled unsolicited or unprompted SSBs) and a first set of ROs and on-demand SSBs and a second set of ROs. In some examples, the network entity 105-*a* may monitor for RACH messages 240 in each of the first set of ROs and the network entity 105-*a* may monitor for RACH messages 240 in each RO of the second set of ROs that corresponds to an on-demand SSB that was actually transmitted by the network entity 105-*a* (e.g., and accordingly the UE 115-*a* may be allowed to transmit RACH messages in the ROs of the second set of ROs that correspond to the on-demand SSBs that were actually transmitted by the network entity 105-*a*).

In some examples, for example as described with reference to FIG. 5, in response to the transmission of an on-demand SSB 230, the network entity 105-*a* may dynamically indicate (e.g., in a DCI 235) uplink resources for an RO that corresponds to the on-demand SSB.

Figure 3:
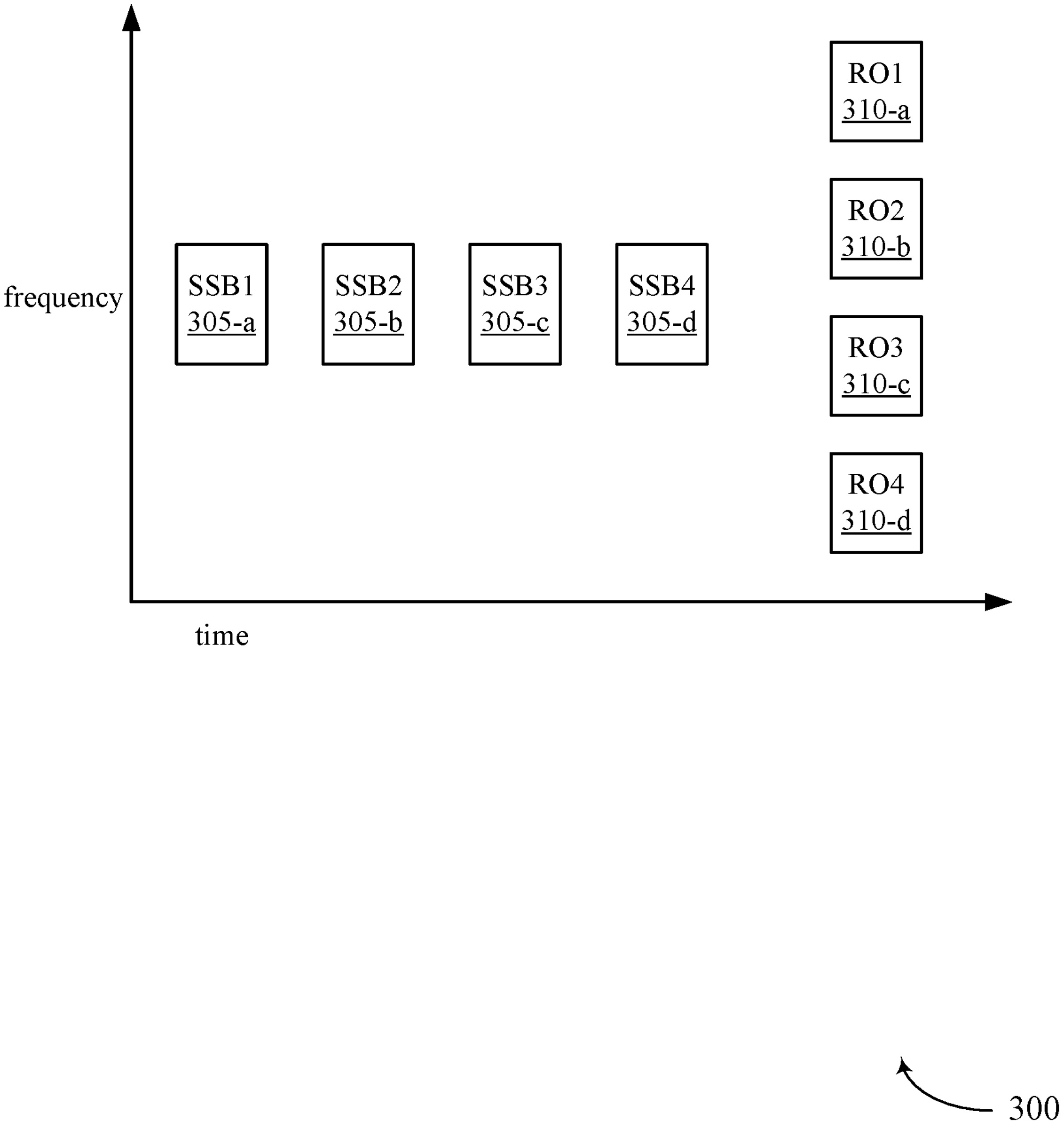
FIG. 3 shows an example of a resource diagram that supports RO configuration for on-demand SSBs in accordance with one or more aspects of the present disclosure.

FIG. 3 shows an example of a resource diagram 300 that supports RO configuration for on-demand SSBs in accordance with one or more aspects of the present disclosure. The resource diagram 300 may implement or may be implemented by aspects of the wireless communications system 100 or the wireless communications system 200.

In some examples, a network entity 105 may configure (e.g., via RRC or SI) an association or mapping between on-demand SSBs 305 (e.g., a first SSB 305-*a*, a second SSB 305-*b*, a third SSB 305-*c*, and a fourth SSB 305-*d*) and corresponding ROs (e.g., a first RO 310-*a*, a second RO 310-*b*, a third RO 310-*c*, and a fourth RO 310-*d*). For example, the first SSB 305-*a* may be mapped to the first RO 310-*a*, the second SSB 305-*b* may be mapped to the second RO 310-*b*, the third SSB 305-*c* may be mapped to the third RO 310-*c*, and the fourth SSB 305-*d* may be mapped to the fourth RO 310-*d*.

In some examples, the network entity 105 may be configured to always monitor in the ROs 310 whether or not the corresponding on-demand SSB 305 is transmitted. Similarly, the UE 115 may be allowed to transmit in each RO 310 whether or not the corresponding on-demand SSB 305 is received. For example, if the network entity 105 does not transmit the third SSB 305-*c* and the fourth SSB 305-*d* because the network entity 105 did not receive a request for the third SSB 305-*c* and the fourth SSB 305-*d*, the network entity 105 may still monitor the corresponding third RO 310-*c* and the corresponding fourth RO 310-*d* for an uplink message from the UE 115. Similarly, the UE 115 may still be allowed to transmit in the third RO 310-*c* and the fourth RO 310-*d* even if the UE 115 did not receive the third SSB 305-*c* or the fourth SSB 305-*d*.

In some examples, the network entity 105 may be configured to only monitor in ROs that correspond to on-demand SSBs 305 that were transmitted. Similarly, the UE 115 may be allowed to transmit uplink messages only in ROs that correspond to on-demand SSBs 305 that were received. For example, if the network entity 105 transmits the first SSB 305-*a* and the second SSB 305-*b* in response to a request from the UE 115, the network entity 105 may monitor for an uplink transmission from the UE 115 in the corresponding first RO 310-*a* and the corresponding second RO 310-*b*. If the network entity 105 does not transmit the third SSB 305-*c* and the fourth SSB 305-*d* because the network entity 105 did not receive a request for the third SSB 305-*c* and the fourth SSB 305-*d*, the network entity 105 may refrain from monitoring the corresponding third RO 310-*c* and the corresponding fourth RO 310-*d* for an uplink message from the UE 115, and the UE 115 may refrain from transmitting in the corresponding third RO 310-*c* and the corresponding fourth RO 310-*d*.

Figure 4:
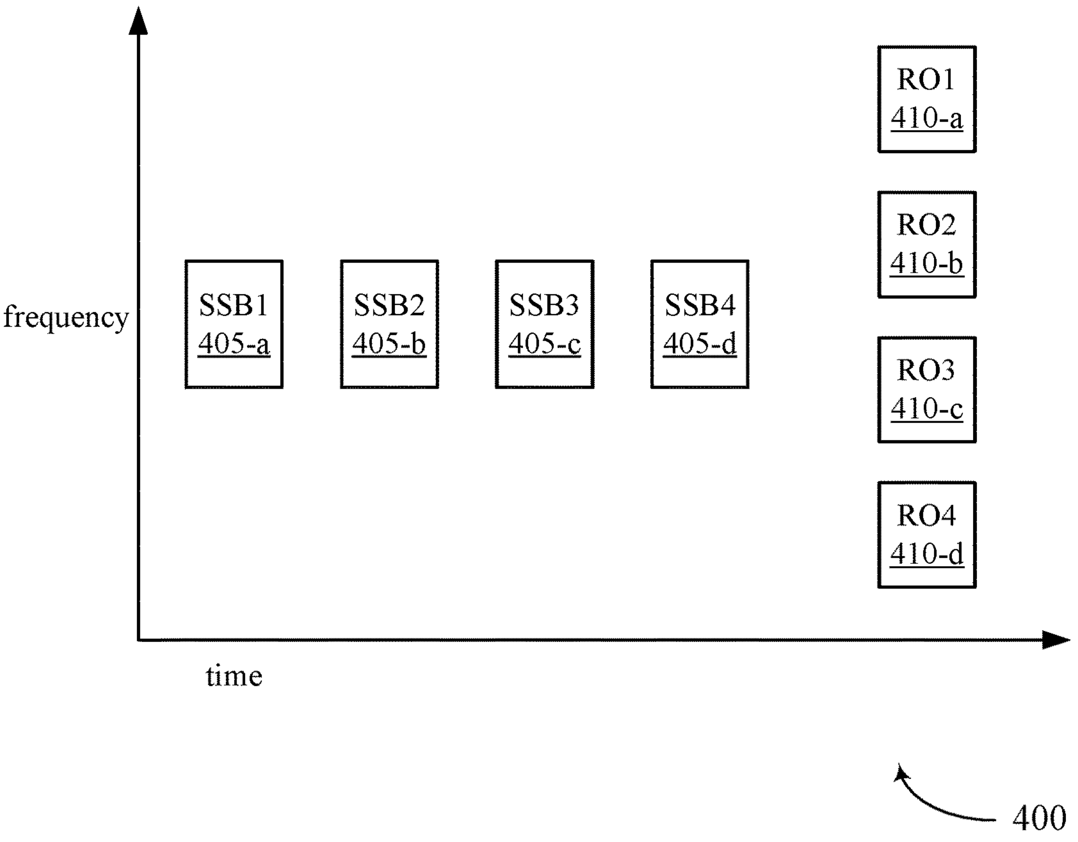
FIG. 4 shows examples of resource diagrams that support RO configuration for on-demand SSBs in accordance with one or more aspects of the present disclosure.
Figure 4:
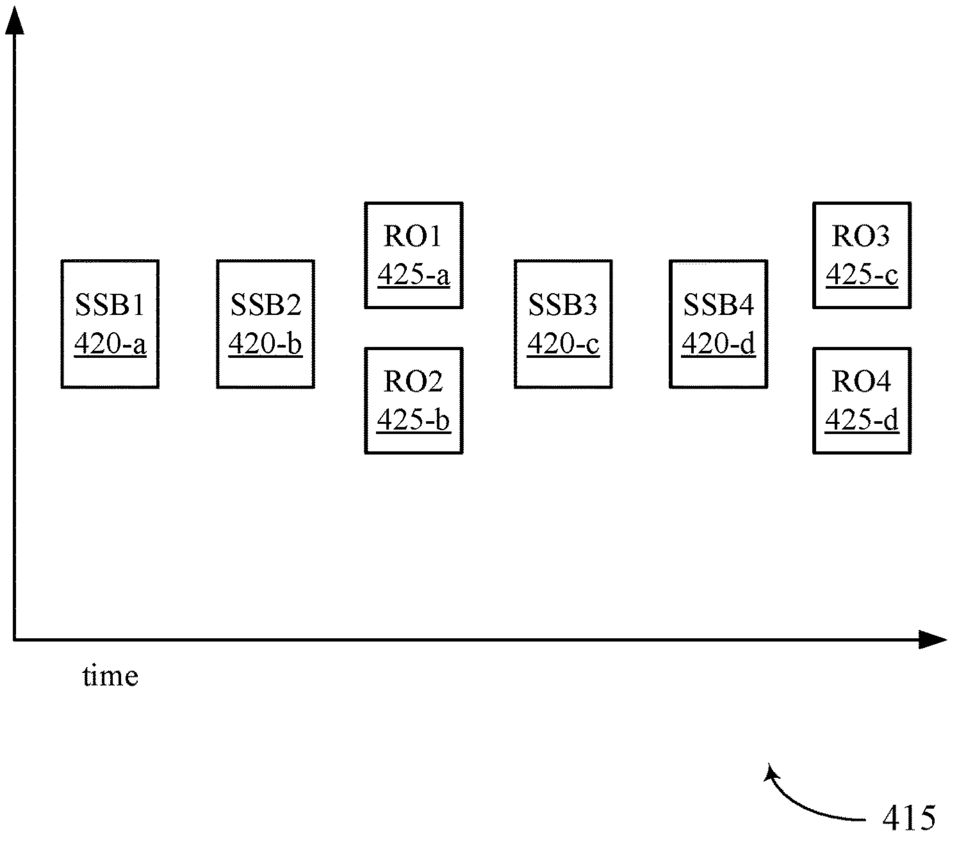

FIG. 4 shows an example of a resource diagram 400 and a resource diagram 415 that support RO configuration for on-demand SSBs in accordance with one or more aspects of the present disclosure. The resource diagram 400 and the resource diagram 415 may implement or may be implemented by aspects of the wireless communications system 100 or the wireless communications system 200.

In some examples, as shown in the resource diagram 400 a network entity 105 may configure (e.g., via RRC or SI) an association or mapping between legacy SSBs 405 (e.g., periodically scheduled unsolicited or unprompted SSBs including a first SSB 405-*a*, a second SSB 405-*b*, a third SSB 405-*c*, and a fourth SSB 405-*d*) and a first set of corresponding ROs (e.g., a first RO 410-*a*, a second RO 410-*b*, a third RO 410-*c*, and a fourth RO 410-*d*). In some examples, as shown in the resource diagram 415 the network entity 105 may also separately configure (e.g., in via RRC or SI) an association or mapping between on-demand SSBs 420 (e.g., a first SSB 420-*a*, a second SSB 420-*b*, a third SSB 420-*c*, and a fourth SSB 420-*d*) and a second set of corresponding ROs (e.g., a first RO 425-*a*, a second RO 425-*b*, a third RO 425-*c*, and a fourth RO 425-*d*). For example, one field or information element may configure the association or mapping between legacy SSBs 405 and a first set of ROs 410 and a second field or information element may configure the association or mapping between the on-demand SSBs 420 and the second set of ROs 425. A separate configuration of an association between on-demand SSBs 420 and a second set of ROs may enable mappings between the on-demand SSBs 420 and ROs 425 based on requests from the UE 115. As shown, the duration between on-demand SSBs 420 and ROs 425 may be shorter than the duration between legacy SSBs 405 and ROs 410, which may allow for higher efficiency of association between on-demand SSBs 420 and ROs 425.

Figure 5:
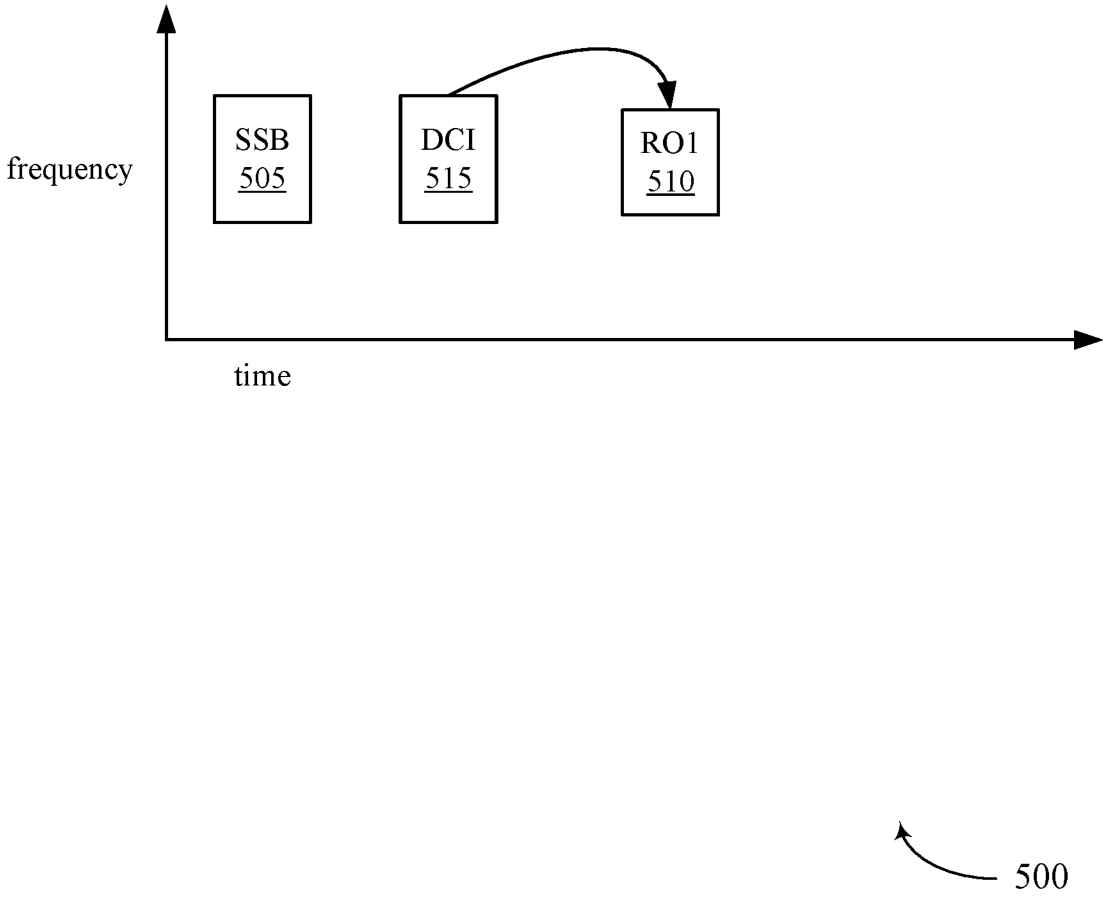
FIG. 5 shows an example of a resource diagram that supports RO configuration for on-demand SSBs in accordance with one or more aspects of the present disclosure.

FIG. 5 shows an example of a resource diagram 500 that supports RO configuration for on-demand SSBs in accordance with one or more aspects of the present disclosure. The resource diagram 500 may implement or may be implemented by aspects of the wireless communications system 100 or the wireless communications system 200.

In some examples, the network entity 105 may dynamically indicate the uplink resources for an RO 510 that corresponds to an on-demand SSB 505. For example, in response to a request from a UE 115 for an on-demand SSB 505, the network entity 105 may make an online decision for the uplink resources used for the RO 510 that corresponds to the on-demand SSB 505. The network entity 105-*a* may transmit dynamic signaling 515 that indicates the uplink resources used for the RO 510. In some examples, the dynamic signaling 515 may provide information regarding a set of preambles that the UE 115 may use or transmit in the RO 510. For example, the dynamic signaling 515 may indicate a specific preamble or a group of candidate preambles. In some examples, the dynamic signaling 515 may be a MAC control element (MAC-CE) or a DCI.

For example, the dynamic signaling 515 may be a DCI that is received by the UE in a pre-configured (e.g., configured via RRC) physical downlink control channel (PDCCH) monitoring occasion associated with the on-demand SSB 505. The DCI received via the PDCCH monitoring occasion associated with the on-demand SSB 505 may indicate scheduling information for the Msg1 preamble that the UE 115 may transmit in the RO 510. As another example, the dynamic signaling 515 may be a DCI that is received by the UE in a pre-configured (e.g., configured via RRC) PDCCH monitoring occasion that is configured to schedule a physical downlink shared channel (PDSCH). For example, a DCI for scheduling a PDSCH may be reinterpreted or reused to schedule uplink resources for the Msg1 preamble that the UE 115 may transmit in the RO 510.

Figure 6:
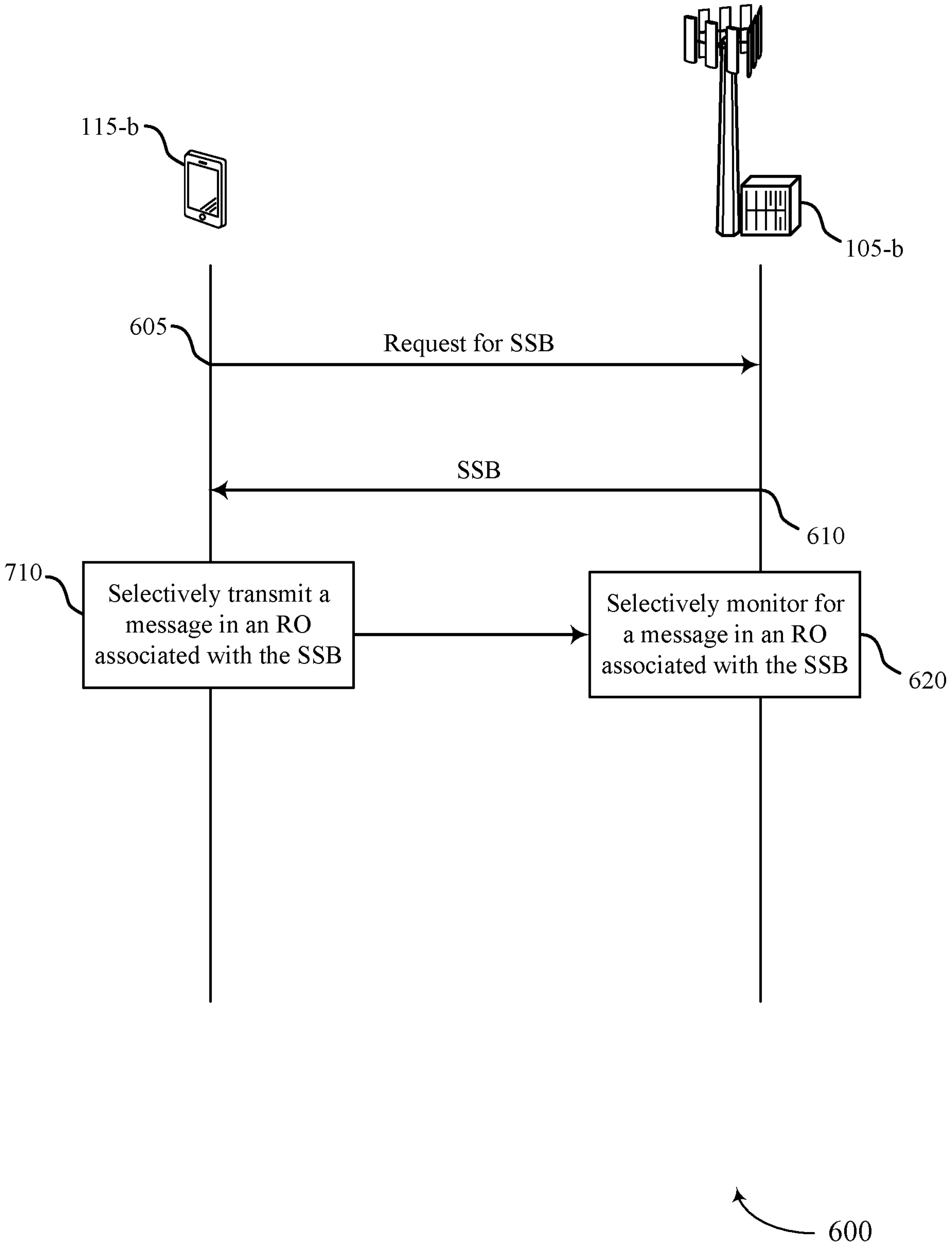
FIG. 6 shows an example of a process flow that supports RO configuration for on-demand SSBs in accordance with one or more aspects of the present disclosure.

FIG. 6 shows an example of a process flow 600 that supports RO configuration for on-demand SSBs in accordance with one or more aspects of the present disclosure. The process flow 600 may include a UE 115-*b*, which may be an example of a UE 115 as described herein. The process flow 600 may include a network entity 105-*b*, which may be an example of a network entity 105 as described herein. In the following description of the process flow 600, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 600, and other operations may be added to the process flow 600.

At 605, the UE 115-*b* may transmit, to the network entity 105-*b*, a request for an SSB. In some examples, the request may be an uplink WUS.

At 610, the network entity 105-*b* may transmit, to the UE 115-*b* and in response to the request, the SSB.

At 615, the UE 115-*b* may selectively transmit, to the network entity 105-*b* and based on reception of the SSB, a message in an RO, where the RO is associated with the SSB. At 620, the network entity 105-*b* may accordingly selectively monitor for, based on transmission of the SSB at 610, a message from the UE 115-*b* in the RO associated with the SSB. As used herein, selectively performing an action (e.g., selectively transmitting or selectively monitoring for) based on one or more factors is to be understood as meaning that whether or not the action is performed is based on (e.g., depends on) the one or more factors.

In some examples, the UE 115-*b* may receive, from the network entity 105-*b* control signaling indicating a first mapping between a first set of SSBs and a first set of ROs, where the first set of SSBs includes the SSB, where the first set of ROs includes the RO, and where the first mapping indicates that the RO is associated with the SSB. In some examples, the UE 115-*b* may selectively refrain from transmitting a second message in a second RO of the first set of ROs associated with a second SSB of the first set of SSBs based on a determination that the second SSB was not received, where the first mapping indicates that the second RO is associated with the SSB. In such examples, the network entity 105-*b* may selectively refrain from monitoring for the second message from the UE 115-*b* in the second RO of the first set of ROs associated with the second SSB of the first set of SSBs based on refraining from transmitting the second SSB. In some examples, the UE 115-*b* may selectively transmit a second message in a second RO of the first set of ROs associated with a second SSB of the first set of SSBs that was not received based at on the control signaling indicating that the first set of SSBs are on-demand SSBs, where the first mapping indicates that the second RO is associated with the SSB. In such examples, the network entity 105-*b* may selectively monitor for the second message in a second RO of the first set of ROs associated with the second SSB of the first set of SSBs that was not transmitted based on the control signaling indicating that the first set of SSBs are on-demand SSBs. In some examples, the UE 115-*b* may receive, with the control signaling, an indication of a second mapping between a second set of SSBs and a second set of ROs, where the control signaling indicates that the first set of SSBs are on-demand SSBs, and where the control signaling indicates that the second set of SSBs are unsolicited. In some examples, a first maximum duration between any SSB of the first set of SSBs and an associated RO of the first set of ROs in accordance with the first mapping is less than a second maximum duration between any SSB of the second set of SSBs and an associated RO of the second set of ROs in accordance with the second mapping. In some examples, the control signaling may be received via an RRC message while the UE 115-*b* is in an RRC connected mode with the network entity 105-*b*. In some examples, the control signaling may be received via SI.

In some examples, the UE 115-*b* may receive, from the network entity 105-*b* and in response to the request at 605, control signaling indicating the RO associated with the SSB. In some examples, the UE 115-*b* may receive, with the control signaling, an indication of a set of preambles associated with the RO, and transmitting the message includes transmitting one of the set of preambles. In some examples, the control signaling may be a DCI received via a downlink control channel monitoring occasion (e.g., a PDCCH monitoring occasion) associated with the SSB. In some examples, the control signaling may be a DCI received via a downlink control channel monitoring occasion (e.g., a PDCCH monitoring occasion) associated with scheduling a downlink shared channel (e.g., a PDSCH) transmission from the network entity.

Figure 7:
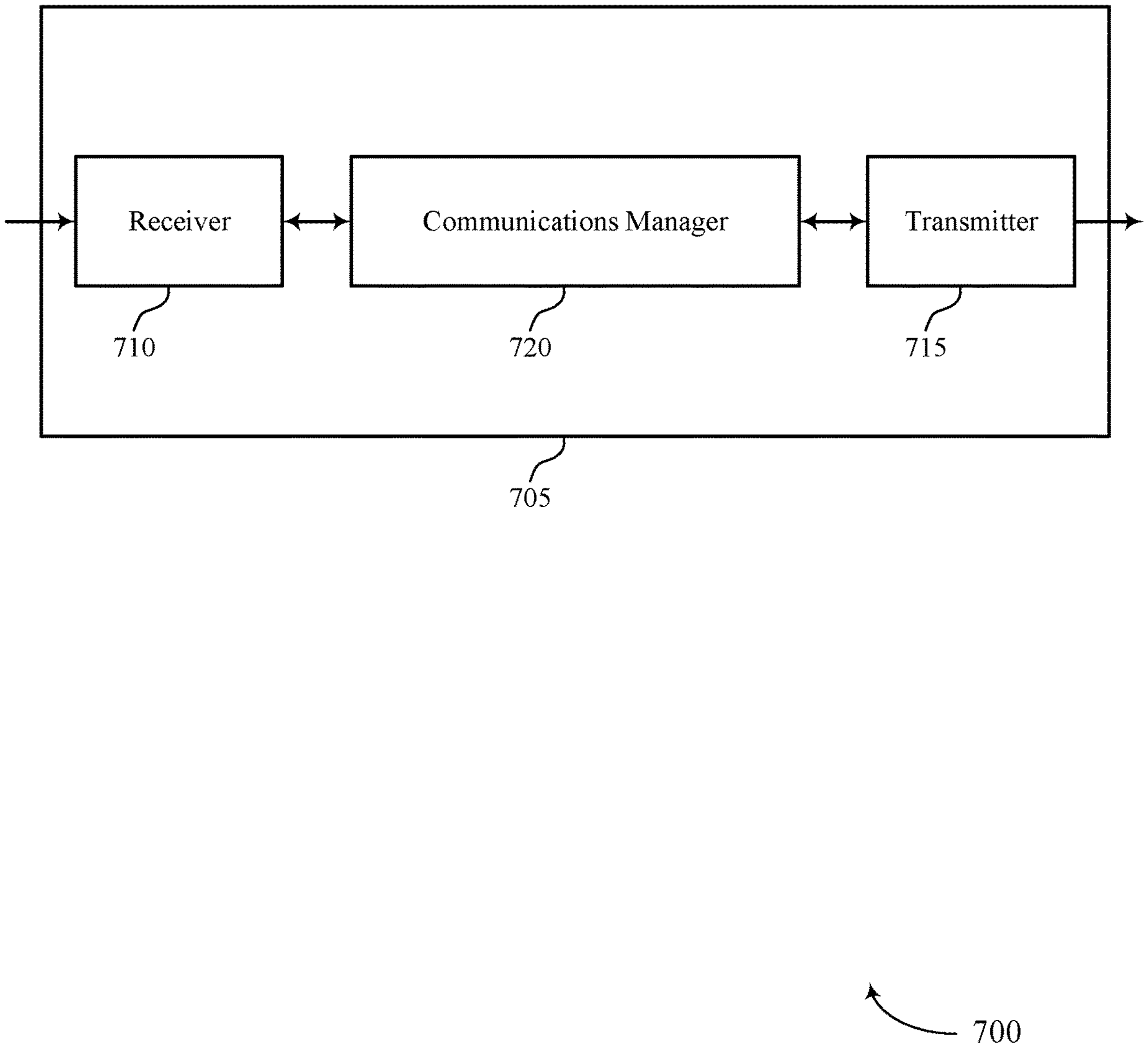
FIGS. 7 and 8 show block diagrams of devices that support RO configuration for on-demand SSBs in accordance with one or more aspects of the present disclosure.

FIG. 7 shows a block diagram 700 of a device 705 that supports RO configuration for on-demand SSBs in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to RO configuration for on-demand SSBs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RO configuration for on-demand SSBs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of RO configuration for on-demand SSBs as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for transmitting, to a network entity, a request for a SSB. The communications manager 720 is capable of, configured to, or operable to support a means for receiving, from the network entity and in response to the request, the SSB. The communications manager 720 is capable of, configured to, or operable to support a means for selectively transmitting, to the network entity and based on reception of the SSB, a message in an RO, where the RO is associated with the SSB.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced power consumption and more efficient utilization of communication resources.

Figure 8:
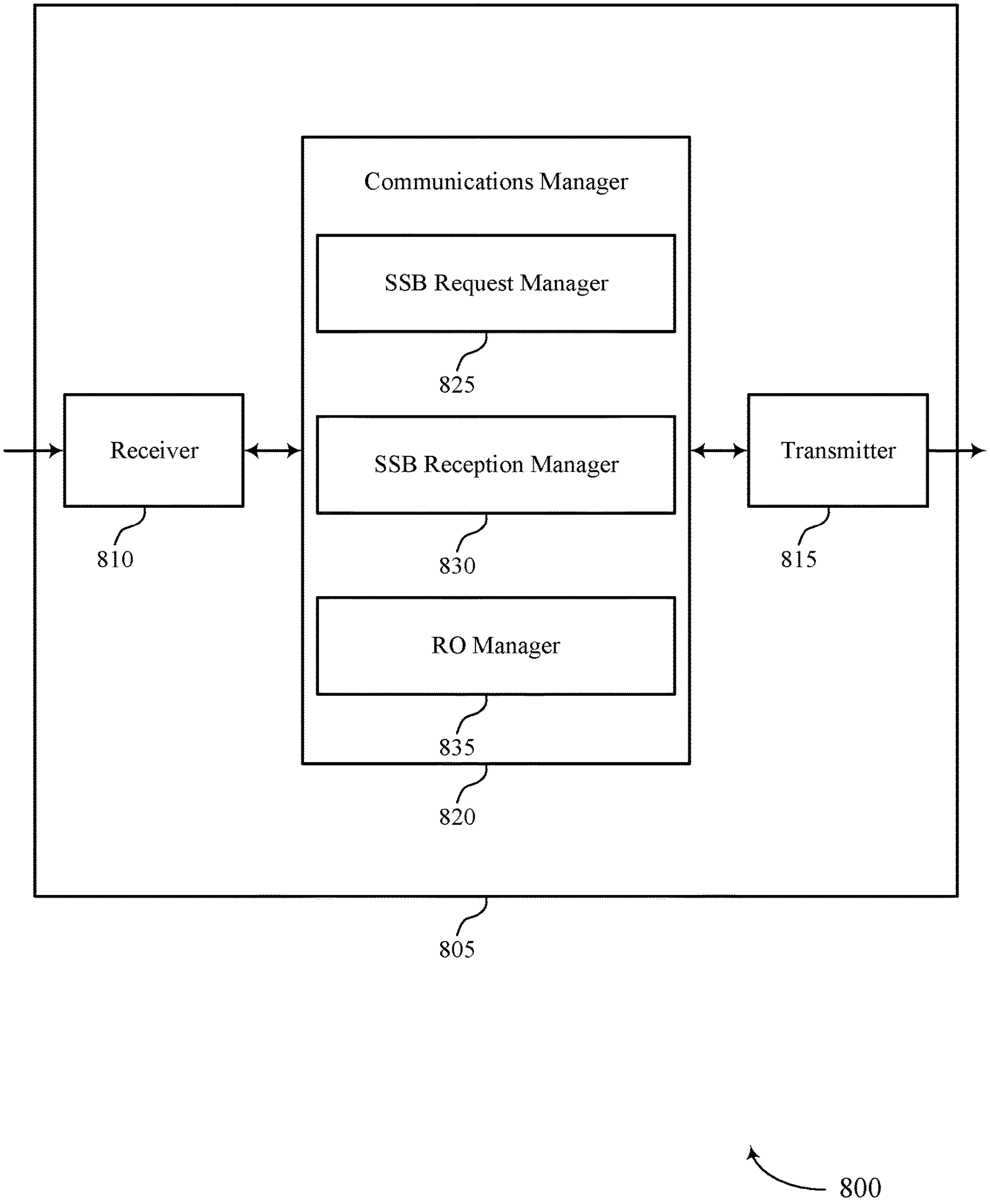

FIG. 8 shows a block diagram 800 of a device 805 that supports RO configuration for on-demand SSBs in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques.

Each of these components may be in communication with one another (e.g., via one or more buses).

The receiver 810 may provide a means for receiving information such as packets, user data, control information, or any combination thereof associated with various information channels (e.g., control channels, data channels, information channels related to RO configuration for on-demand SSBs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RO configuration for on-demand SSBs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of RO configuration for on-demand SSBs as described herein. For example, the communications manager 820 may include an SSB request manager 825, an SSB reception manager 830, an RO manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The SSB request manager 825 is capable of, configured to, or operable to support a means for transmitting, to a network entity, a request for a SSB. The SSB reception manager 830 is capable of, configured to, or operable to support a means for receiving, from the network entity and in response to the request, the SSB. The RO manager 835 is capable of, configured to, or operable to support a means for selectively transmitting, to the network entity and based on reception of the SSB, a message in an RO, where the RO is associated with the SSB.

Figure 9:
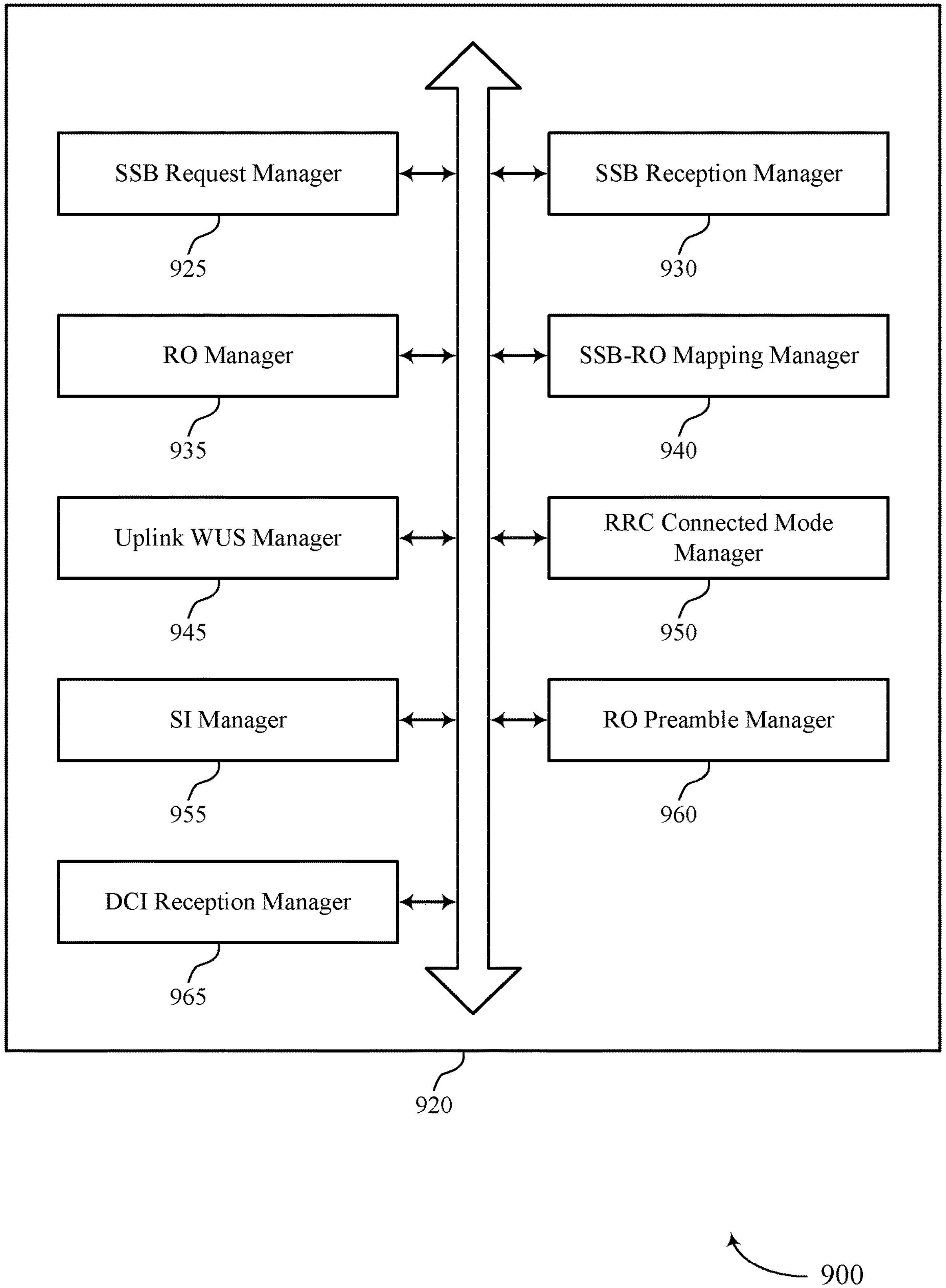
FIG. 9 shows a block diagram of a communications manager that supports RO configuration for on-demand SSBs in accordance with one or more aspects of the present disclosure.

FIG. 9 shows a block diagram 900 of a communications manager 920 that supports RO configuration for on-demand SSBs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of RO configuration for on-demand SSBs as described herein. For example, the communications manager 920 may include an SSB request manager 925, an SSB reception manager 930, an RO manager 935, an SSB-RO mapping manager 940, an uplink WUS manager 945, an RRC connected mode manager 950, an SI manager 955, an RO preamble manager 960, a DCI reception manager 965, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The SSB request manager 925 is capable of, configured to, or operable to support a means for transmitting, to a network entity, a request for a SSB. The SSB reception manager 930 is capable of, configured to, or operable to support a means for receiving, from the network entity and in response to the request, the SSB. The RO manager 935 is capable of, configured to, or operable to support a means for selectively transmitting, to the network entity and based on reception of the SSB, a message in an RO, where the RO is associated with the SSB.

In some examples, the SSB-RO mapping manager 940 is capable of, configured to, or operable to support a means for receiving, from the network entity, control signaling indicating a first mapping between a first set of SSBs and a first set of ROs, where the first set of SSBs includes the SSB, where the first set of ROs includes the RO, and where the first mapping indicates that the RO is associated with the SSB.

In some examples, the RO manager 935 is capable of, configured to, or operable to support a means for selectively refraining from transmitting a second message in a second RO of the first set of ROs associated with a second SSB of the first set of SSBs based on a determination that the second SSB was not received, where the first mapping indicates that the second RO is associated with the SSB.

In some examples, the RO manager 935 is capable of, configured to, or operable to support a means for selectively transmitting a second message in a second RO of the first set of ROs associated with a second SSB of the first set of SSBs that was not received based on the control signaling indicating that the first set of SSBs are on-demand SSBs, where the first mapping indicates that the second RO is associated with the SSB.

In some examples, the SSB-RO mapping manager 940 is capable of, configured to, or operable to support a means for receiving, with the control signaling, an indication of a second mapping between a second set of SSBs and a second set of ROs, where the control signaling indicates that the first set of SSBs are on-demand SSBs, and where the control signaling indicates that the second set of SSBs are unsolicited.

In some examples, a first maximum duration between any SSB of the first set of SSBs and an associated RO of the first set of ROs in accordance with the first mapping is less than a second maximum duration between any SSB of the second set of SSBs and an associated RO of the second set of ROs in accordance with the second mapping.

In some examples, to support receiving the control signaling, the RRC connected mode manager 950 is capable of, configured to, or operable to support a means for receiving the control signaling via an RRC message while in an RRC connected mode with the network entity.

In some examples, to support receiving the control signaling, the SI manager 955 is capable of, configured to, or operable to support a means for receiving the control signaling via SI.

In some examples, the SSB-RO mapping manager 940 is capable of, configured to, or operable to support a means for receiving, from the network entity in response to the request, control signaling indicating the RO associated with the SSB.

In some examples, the RO preamble manager 960 is capable of, configured to, or operable to support a means for receiving, with the control signaling, an indication of a set of preambles associated with the RO, where transmitting the message includes transmitting one of the set of preambles.

In some examples, to support receiving the control signaling, the DCI reception manager 965 is capable of, configured to, or operable to support a means for receiving a DCI via a downlink control channel monitoring occasion associated with the SSB.

In some examples, the DCI reception manager 965 is capable of, configured to, or operable to support a means for receiving a DCI via a downlink control channel monitoring occasion associated with scheduling a downlink shared channel transmission from the network entity.

In some examples, to support transmitting the request, the uplink WUS manager 945 is capable of, configured to, or operable to support a means for transmitting an uplink WUS to the network entity.

Figure 10:
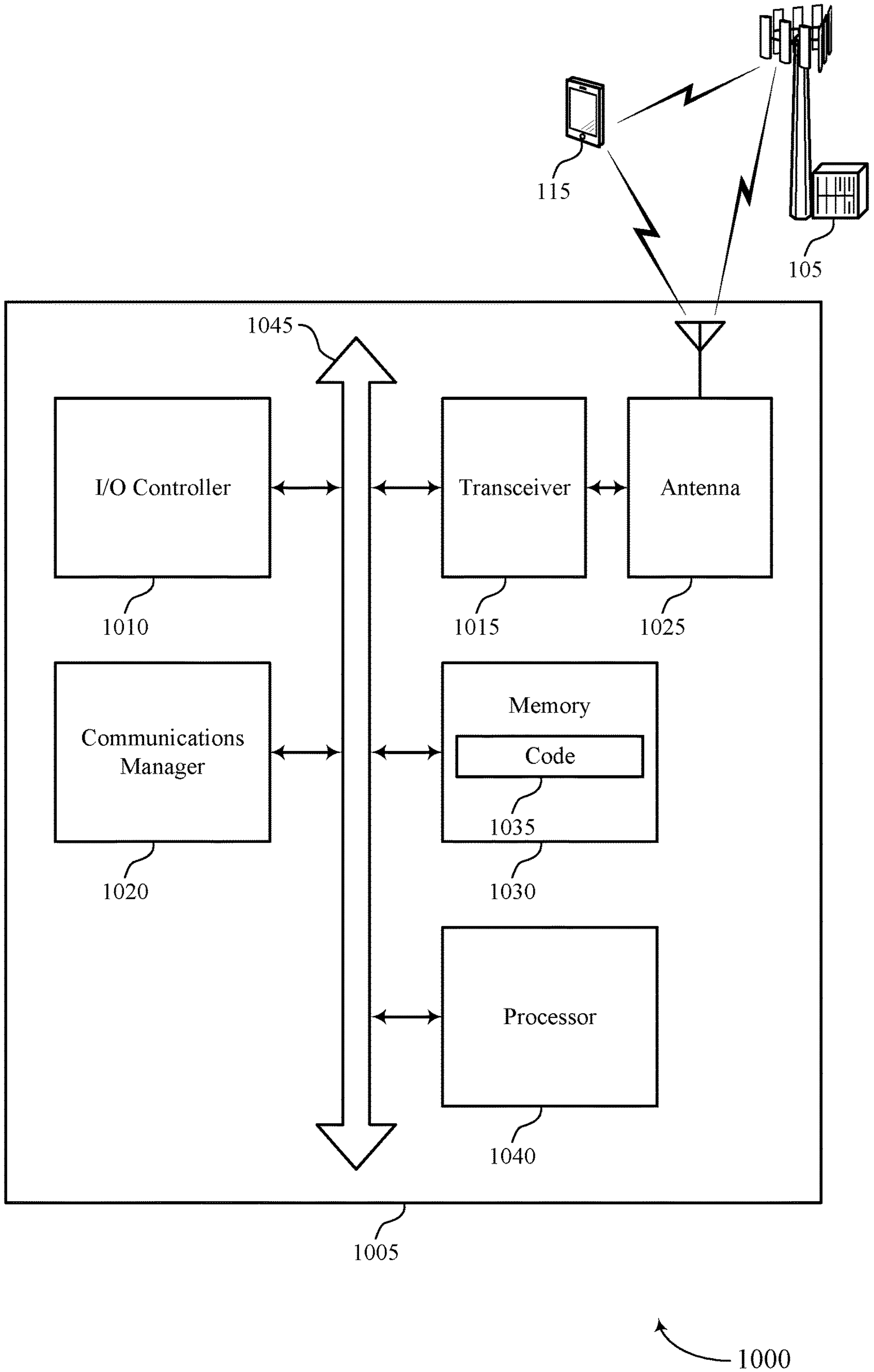
FIG. 10 shows a diagram of a system including a device that supports RO configuration for on-demand SSBs in accordance with one or more aspects of the present disclosure.

FIG. 10 shows a diagram of a system 1000 including a device 1005 that supports RO configuration for on-demand SSBs in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting RO configuration for on-demand SSBs). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. As such, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for transmitting, to a network entity, a request for a SSB. The communications manager 1020 is capable of, configured to, or operable to support a means for receiving, from the network entity and in response to the request, the SSB. The communications manager 1020 is capable of, configured to, or operable to support a means for selectively transmitting, to the network entity and based on reception of the SSB, a message in an RO, where the RO is associated with the SSB.

By including or configuring the communications manager 1020 in accordance with examples as described herein, the device 1005 may support techniques for power consumption, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of RO configuration for on-demand SSBs as described herein, or the at least one processor 1040 and the at least one memory 1030 may be otherwise configured to, individually or collectively, perform or support such operations.

Figure 11:
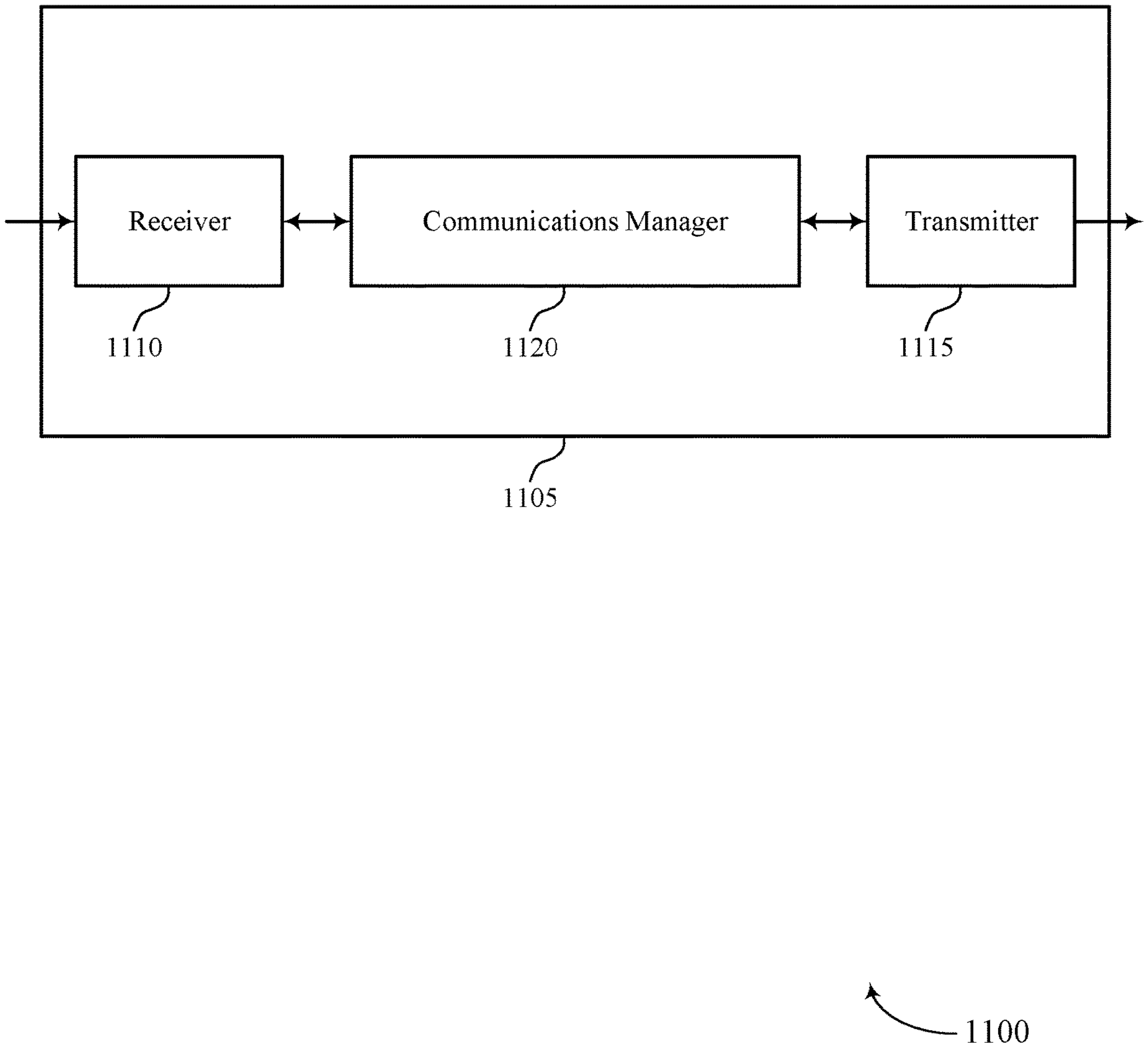
FIGS. 11 and 12 show block diagrams of devices that support RO configuration for on-demand SSBs in accordance with one or more aspects of the present disclosure.

FIG. 11 shows a block diagram 1100 of a device 1105 that supports RO configuration for on-demand SSBs in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of RO configuration for on-demand SSBs as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for receiving, from a UE, a request for a SSB. The communications manager 1120 is capable of, configured to, or operable to support a means for transmitting, to the UE and in response to the request, the SSB. The communications manager 1120 is capable of, configured to, or operable to support a means for selectively monitoring, based on transmission of the SSB, for a message from the UE in an RO, where the RO is associated with the SSB.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced power consumption and more efficient utilization of communication resources.

Figure 12:
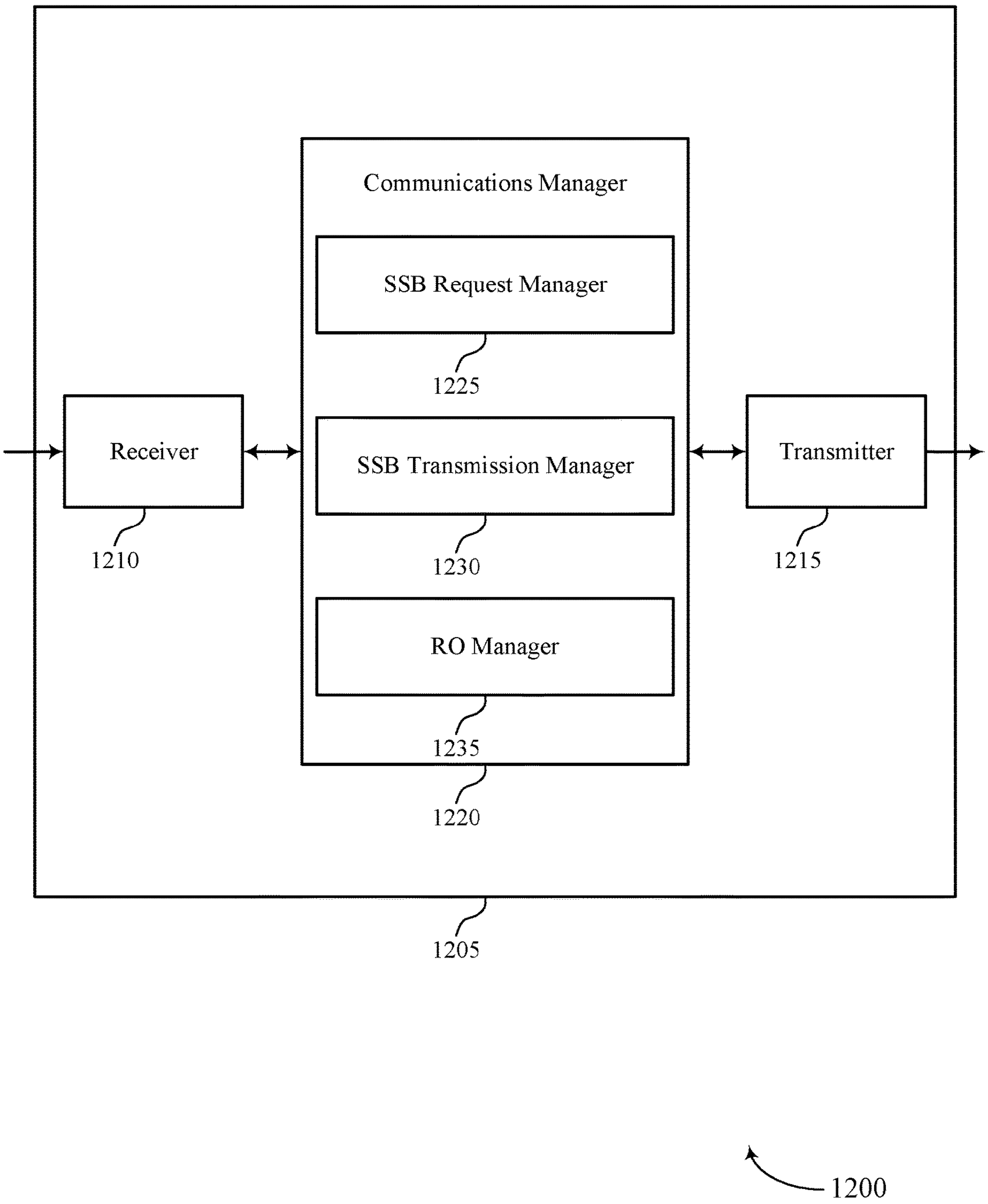

FIG. 12 shows a block diagram 1200 of a device 1205 that supports RO configuration for on-demand SSBs in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of RO configuration for on-demand SSBs as described herein. For example, the communications manager 1220 may include an SSB request manager 1225, an SSB transmission manager 1230, an RO manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The SSB request manager 1225 is capable of, configured to, or operable to support a means for receiving, from a UE, a request for a SSB. The SSB transmission manager 1230 is capable of, configured to, or operable to support a means for transmitting, to the UE and in response to the request, the SSB. The RO manager 1235 is capable of, configured to, or operable to support a means for selectively monitoring, based on transmission of the SSB, for a message from the UE in an RO, where the RO is associated with the SSB.

Figure 13:
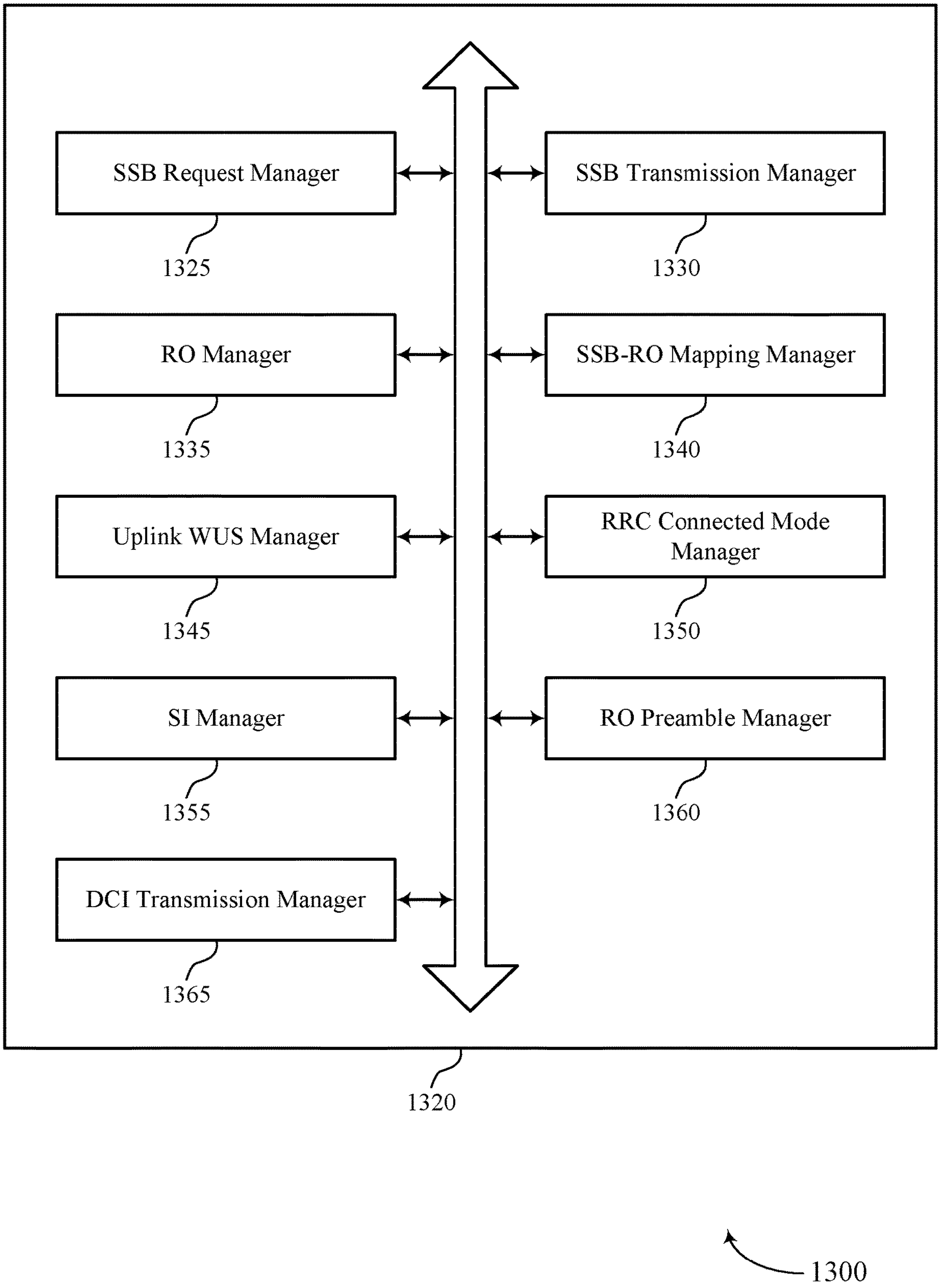
FIG. 13 shows a block diagram of a communications manager that supports RO configuration for on-demand SSBs in accordance with one or more aspects of the present disclosure.

FIG. 13 shows a block diagram 1300 of a communications manager 1320 that supports RO configuration for on-demand SSBs in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of RO configuration for on-demand SSBs as described herein. For example, the communications manager 1320 may include an SSB request manager 1325, an SSB transmission manager 1330, an RO manager 1335, an SSB-RO mapping manager 1340, an uplink WUS manager 1345, an RRC connected mode manager 1350, an SI manager 1355, an RO preamble manager 1360, a DCI transmission manager 1365, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The SSB request manager 1325 is capable of, configured to, or operable to support a means for receiving, from a UE, a request for a SSB. The SSB transmission manager 1330 is capable of, configured to, or operable to support a means for transmitting, to the UE and in response to the request, the SSB. The RO manager 1335 is capable of, configured to, or operable to support a means for selectively monitoring, based on transmission of the SSB, for a message from the UE in an RO, where the RO is associated with the SSB.

In some examples, the SSB-RO mapping manager 1340 is capable of, configured to, or operable to support a means for transmitting, to the UE, control signaling indicating a first mapping between a first set of SSBs and a first set of ROs, where the first set of SSBs includes the SSB, where the first set of ROs includes the RO, and where the first mapping indicates that the RO is associated with the SSB.

In some examples, the RO manager 1335 is capable of, configured to, or operable to support a means for selectively refraining from monitoring for a second message from the UE in a second RO of the first set of ROs associated with a second SSB of the first set of SSBs based on refraining from transmitting the second SSB, where the first mapping indicates that the second RO is associated with the SSB.

In some examples, the RO manager 1335 is capable of, configured to, or operable to support a means for selectively monitoring for a second message in a second RO of the first set of ROs associated with a second SSB of the first set of SSBs that was not transmitted based on the control signaling indicating that the first set of SSBs are on-demand SSBs, where the first mapping indicates that the second RO is associated with the SSB.

In some examples, the SSB-RO mapping manager 1340 is capable of, configured to, or operable to support a means for transmitting, with the control signaling, an indication of a second mapping between a second set of SSBs and a second set of ROs, where the control signaling indicates that the first set of SSBs are on-demand SSBs, and where the control signaling indicates that the second set of SSBs are unsolicited.

In some examples, a first maximum duration between any SSB of the first set of SSBs and an associated RO of the first set of ROs in accordance with the first mapping is less than a second maximum duration between any SSB of the second set of SSBs and an associated RO of the second set of ROs in accordance with the second mapping.

In some examples, to support transmitting the control signaling, the RRC connected mode manager 1350 is capable of, configured to, or operable to support a means for transmitting the control signaling via an RRC message while an RRC connected mode with the network entity.

In some examples, to support transmitting the control signaling, the SI manager 1355 is capable of, configured to, or operable to support a means for transmitting the control signaling via SI.

In some examples, the SSB-RO mapping manager 1340 is capable of, configured to, or operable to support a means for transmitting, to the UE in response to the request, control signaling indicating the RO associated with the SSB.

In some examples, the RO preamble manager 1360 is capable of, configured to, or operable to support a means for transmitting, with the control signaling, an indication of a set of preambles associated with the RO, where receiving the message includes receiving one of the set of preambles.

In some examples, to support transmitting the control signaling, the DCI transmission manager 1365 is capable of, configured to, or operable to support a means for transmitting a DCI via a downlink control channel monitoring occasion associated with the SSB.

In some examples, to support transmitting the control signaling, the DCI transmission manager 1365 is capable of, configured to, or operable to support a means for transmitting a DCI via a downlink control channel monitoring occasion associated with scheduling a downlink shared channel transmission.

In some examples, to support receiving the request, the uplink WUS manager 1345 is capable of, configured to, or operable to support a means for receiving an uplink WUS from the UE.

Figure 14:
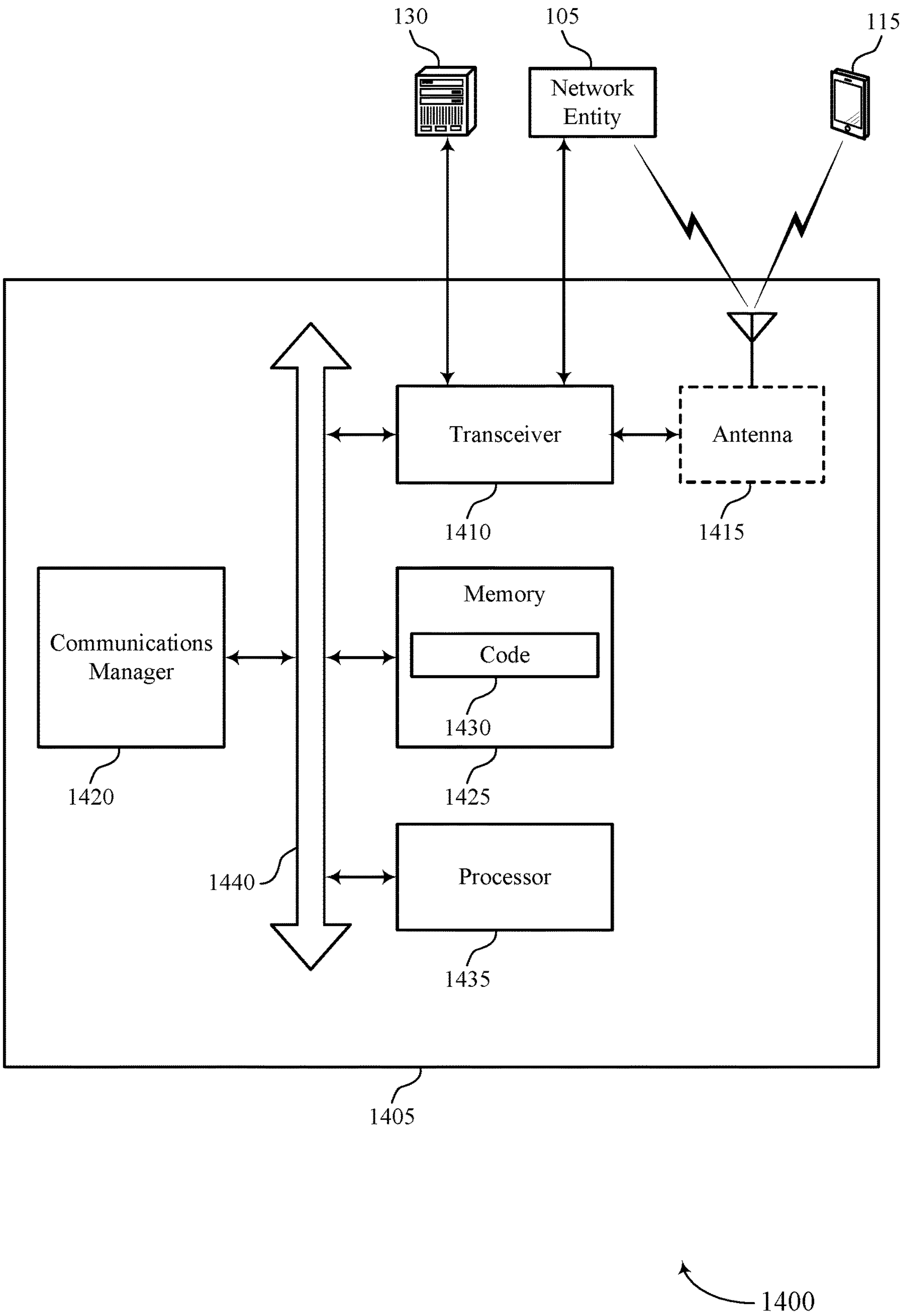
FIG. 14 shows a diagram of a system including a device that supports RO configuration for on-demand SSBs in accordance with one or more aspects of the present disclosure.

FIG. 14 shows a diagram of a system 1400 including a device 1405 that supports RO configuration for on-demand SSBs in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting RO configuration for on-demand SSBs). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. As such, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for receiving, from a UE, a request for a SSB. The communications manager 1420 is capable of, configured to, or operable to support a means for transmitting, to the UE and in response to the request, the SSB. The communications manager 1420 is capable of, configured to, or operable to support a means for selectively monitoring, based on transmission of the SSB, for a message from the UE in an RO, where the RO is associated with the SSB.

By including or configuring the communications manager 1420 in accordance with examples as described herein, the device 1405 may support techniques for power consumption, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of RO configuration for on-demand SSBs as described herein, or the at least one processor 1435 and the at least one memory 1425 may be otherwise configured to, individually or collectively, perform or support such operations.

Figure 15:
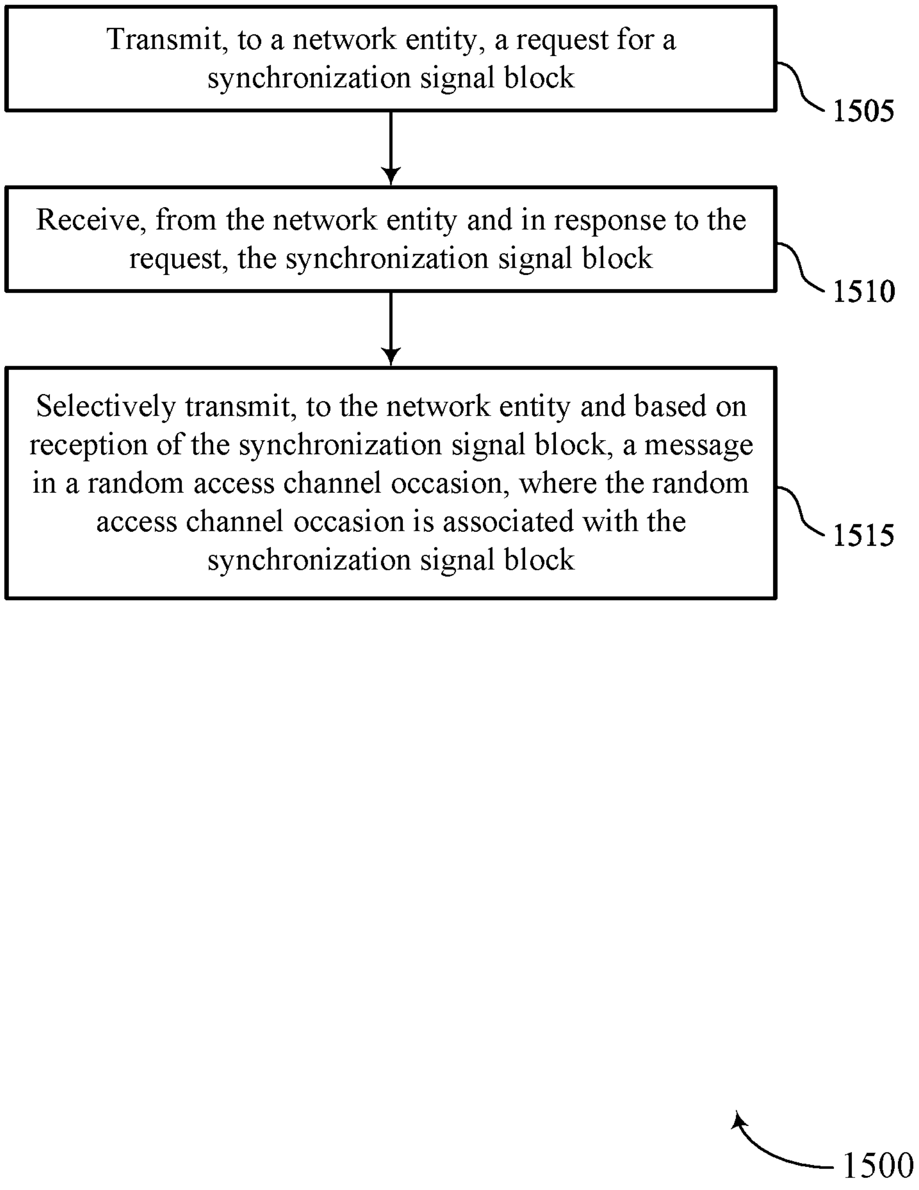
FIGS. 15 and 16 show flowcharts illustrating methods that support RO configuration for on-demand SSBs in accordance with one or more aspects of the present disclosure.

FIG. 15 shows a flowchart illustrating a method 1500 that supports RO configuration for on-demand SSBs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a request for a SSB. The operations of block 1505 may be performed in accordance with examples as disclosed herein. In some examples, aspects of the operations of 1505 may be performed by an SSB request manager 925 as described with reference to FIG. 9.

At 1510, the method may include receiving, from the network entity and in response to the request, the SSB. The operations of block 1510 may be performed in accordance with examples as disclosed herein. In some examples, aspects of the operations of 1510 may be performed by an SSB reception manager 930 as described with reference to FIG. 9.

At 1515, the method may include selectively transmitting, to the network entity and based on reception of the SSB, a message in an RO, where the RO is associated with the SSB. The operations of block 1515 may be performed in accordance with examples as disclosed herein. In some examples, aspects of the operations of 1515 may be performed by an RO manager 935 as described with reference to FIG. 9.

Figure 16:
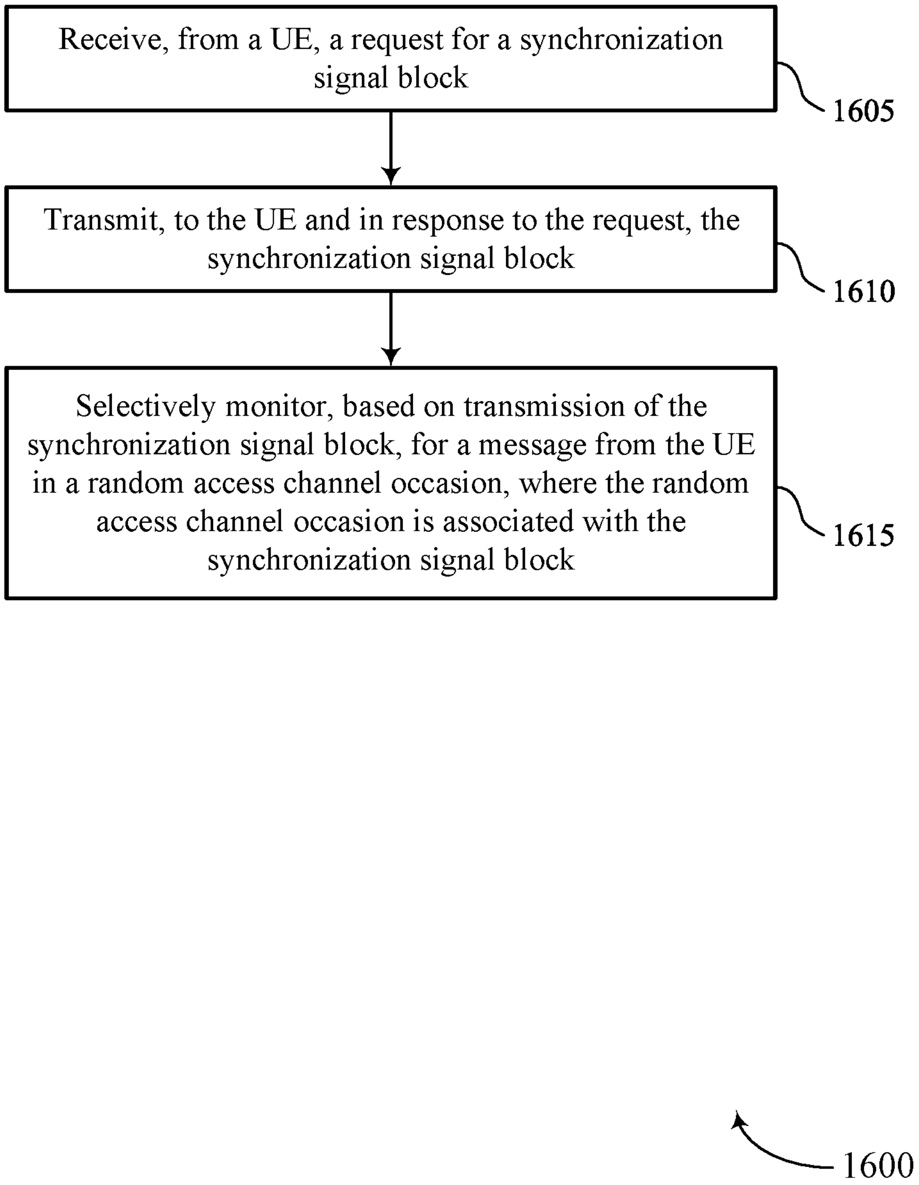

FIG. 16 shows a flowchart illustrating a method 1600 that supports RO configuration for on-demand SSBs in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a request for a SSB. The operations of block 1605 may be performed in accordance with examples as disclosed herein. In some examples, aspects of the operations of 1605 may be performed by an SSB request manager 1325 as described with reference to FIG. 13.

At 1610, the method may include transmitting, to the UE and in response to the request, the SSB. The operations of block 1610 may be performed in accordance with examples as disclosed herein. In some examples, aspects of the operations of 1610 may be performed by an SSB transmission manager 1330 as described with reference to FIG. 13.

At 1615, the method may include selectively monitoring, based on transmission of the SSB, for a message from the UE in an RO, where the RO is associated with the SSB. The operations of block 1615 may be performed in accordance with examples as disclosed herein. In some examples, aspects of the operations of 1615 may be performed by an RO manager 1335 as described with reference to FIG. 13.

The following provides an overview of aspects of the present disclosure:

Aspect 1: A method for wireless communications at a UE, comprising: transmitting, to a network entity, a request for a SSB; receiving, from the network entity and in response to the request, the SSB; and selectively transmitting, to the network entity and based at least in part on reception of the SSB, a message in a RO, wherein the RO is associated with the SSB.

Aspect 2: The method of aspect 1, further comprising: receiving, from the network entity, control signaling indicating a first mapping between a first set of SSBs and a first set of ROs, wherein the first set of SSBs includes the SSB, wherein the first set of ROs includes the RO, and wherein the first mapping indicates that the RO is associated with the SSB.

Aspect 3: The method of aspect 2, further comprising: selectively refraining from transmitting a second message in a second RO of the first set of ROs associated with a second SSB of the first set of SSBs based at least in part on a determination that the second SSB was not received, wherein the first mapping indicates that the second RO is associated with the SSB.

Aspect 4: The method of any of aspects 2 through 3, further comprising: selectively transmitting a second message in a second RO of the first set of ROs associated with a second SSB of the first set of SSBs that was not received based at least in part on the control signaling indicating that the first set of SSBs are on-demand SSBs, wherein the first mapping indicates that the second RO is associated with the SSB.

Aspect 5: The method of any of aspects 2 through 4, further comprising: receiving, with the control signaling, an indication of a second mapping between a second set of SSBs and a second set of ROs, wherein the control signaling indicates that the first set of SSBs are on-demand SSBs, and wherein the control signaling indicates that the second set of SSBs are un-solicited.

Aspect 6: The method of aspect 5, wherein a first maximum duration between any SSB of the first set of SSBs and an associated RO of the first set of ROs in accordance with the first mapping is less than a second maximum duration between any SSB of the second set of SSBs and an associated RO of the second set of ROs in accordance with the second mapping.

Aspect 7: The method of any of aspects 2 through 6, wherein receiving the control signaling comprises: receiving the control signaling via an RRC message while in an RRC connected mode with the network entity.

Aspect 8: The method of any of aspects 2 through 6, wherein receiving the control signaling comprises: receiving the control signaling via SI.

Aspect 9: The method of aspect 1, further comprising: receiving, from the network entity in response to the request, control signaling indicating the RO associated with the SSB.

Aspect 10: The method of aspect 9, further comprising: receiving, with the control signaling, an indication of a set of preambles associated with the RO, wherein transmitting the message comprises transmitting one of the set of preambles.

Aspect 11: The method of any of aspects 9 through 10, wherein receiving the control signaling comprises: receiving a DCI via a downlink control channel monitoring occasion associated with the SSB.

Aspect 12: The method of any of aspects 9 through 10, further comprising: receiving a DCI via a downlink control channel monitoring occasion associated with scheduling a downlink shared channel transmission from the network entity.

Aspect 13: The method of any of aspects 1 through 12, wherein transmitting the request comprises: transmitting an uplink WUS to the network entity.

Aspect 14: A method for wireless communications at a network entity, comprising: receiving, from a UE, a request for a SSB; transmitting, to the UE and in response to the request, the SSB; and selectively monitoring, based at least in part on transmission of the SSB, for a message from the UE in a RO, wherein the RO is associated with the SSB.

Aspect 15: The method of aspect 14, further comprising: transmitting, to the UE, control signaling indicating a first mapping between a first set of SSBs and a first set of ROs, wherein the first set of SSBs includes the SSB, wherein the first set of ROs includes the RO, and wherein the first mapping indicates that the RO is associated with the SSB.

Aspect 16: The method of aspect 15, further comprising: selectively refraining from monitoring for a second message from the UE in a second RO of the first set of ROs associated with a second SSB of the first set of SSBs based at least in part on refraining from transmitting the second SSB, wherein the first mapping indicates that the second RO is associated with the SSB.

Aspect 17: The method of any of aspects 15 through 16, further comprising: selectively monitoring for a second message in a second RO of the first set of ROs associated with a second SSB of the first set of SSBs that was not transmitted based at least in part on the control signaling indicating that the first set of SSBs are on-demand SSBs, wherein the first mapping indicates that the second RO is associated with the SSB.

Aspect 18: The method of any of aspects 15 through 17, further comprising: transmitting, with the control signaling, an indication of a second mapping between a second set of SSBs and a second set of ROs, wherein the control signaling indicates that the first set of SSBs are on-demand SSBs, and wherein the control signaling indicates that the second set of SSBs are un-solicited.

Aspect 19: The method of aspect 18, wherein a first maximum duration between any SSB of the first set of SSBs and an associated RO of the first set of ROs in accordance with the first mapping is less than a second maximum duration between any SSB of the second set of SSBs and an associated RO of the second set of ROs in accordance with the second mapping.

Aspect 20: The method of any of aspects 15 through 19, wherein transmitting the control signaling comprises: transmitting the control signaling via an RRC message while in an RRC connected mode with the network entity.

Aspect 21: The method of any of aspects 15 through 19, wherein transmitting the control signaling comprises: transmitting the control signaling via SI.

Aspect 22: The method of aspect 14, further comprising: transmitting, to the UE in response to the request, control signaling indicating the RO associated with the SSB.

Aspect 23: The method of aspect 22, further comprising: transmitting, with the control signaling, an indication of a set of preambles associated with the RO, wherein receiving the message comprises receiving one of the set of preambles.

Aspect 24: The method of any of aspects 22 through 23, wherein transmitting the control signaling comprises: transmitting a DCI via a downlink control channel monitoring occasion associated with the SSB.

Aspect 25: The method of any of aspects 22 through 23, wherein transmitting the control signaling comprises: transmitting a DCI via a downlink control channel monitoring occasion associated with scheduling a downlink shared channel transmission.

Aspect 26: The method of any of aspects 14 through 25, wherein receiving the request comprises: receiving an uplink WUS from the UE.

Aspect 27: A UE for wireless communications, comprising one or more memories storing processor-executable code, and one or more processors coupled with the one or more memories and individually or collectively operable to execute the code to cause the UE to perform a method of any of aspects 1 through 13.

Aspect 28: A UE for wireless communications, comprising at least one means for performing a method of any of aspects 1 through 13.

Aspect 29: A non-transitory computer-readable medium storing code for wireless communications, the code comprising instructions executable by a processor to perform a method of any of aspects 1 through 13.

Aspect 30: A network entity for wireless communications, comprising one or more memories storing processor-executable code, and one or more processors coupled with the one or more memories and individually or collectively operable to execute the code to cause the network entity to perform a method of any of aspects 14 through 26.

Aspect 31: A network entity for wireless communications, comprising at least one means for performing a method of any of aspects 14 through 26.

Aspect 32: A non-transitory computer-readable medium storing code for wireless communications, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit, to a network entity, a request for an on-demand synchronization signal block (SSB);

receive, from the network entity and in response to the request, the on-demand SSB, wherein each on-demand SSB of a first set of on-demand SSBs corresponds to a respective random access channel occasion of a first set of random access channel occasions and the first set of on-demand SSBs comprises the on-demand SSB; and transmit, to the network entity, a message in a random access channel occasion of the first set of random access channel occasions, based at least in part on the random access channel occasion corresponding to the on-demand SSB.

2. The UE of claim 1, wherein the one or more processors are individually or collectively further operable to execute the code to cause the UE to:

receive, from the network entity, control signaling indicating a first mapping between the first set of on-demand SSBs and the first set of random access channel occasions, wherein each on-demand SSB of the first set of on-demand SSBs corresponds to the respective random access channel occasion of the first set of random access channel occasions in accordance with the first mapping.

3. The UE of claim 2, wherein the one or more processors are individually or collectively further operable to execute the code to cause the UE to:

selectively refrain from transmitting a second message in a second random access channel occasion of the first set of random access channel occasions corresponding to a second SSB of the first set of on-demand SSBs based at least in part on a determination that the second SSB was not received, wherein the first mapping indicates that the second random access channel occasion corresponds to the second SSB.

4. The UE of claim 2, wherein the one or more processors are individually or collectively further operable to execute the code to cause the UE to:

selectively transmit a second message in a second random access channel occasion of the first set of random access channel occasions corresponding to a second SSB of the first set of on-demand SSBs that was not received based at least in part on the control signaling indicating that the first set of on-demand SSBs are on-demand SSBs, wherein the first mapping indicates that the second random access channel occasion corresponds to the second SSB.

5. The UE of claim 2, wherein the one or more processors are individually or collectively further operable to execute the code to cause the UE to:

receive, with the control signaling, an indication of a second mapping between a second set of SSBs and a second set of random access channel occasions, wherein the control signaling indicates that the first set of on-demand SSBs are on-demand SSBs, and wherein the control signaling indicates that the second set of SSBs are un-solicited.

6. The UE of claim 5, wherein a first maximum duration between any SSB of the first set of on-demand SSBs and a corresponding random access channel occasion of the first set of random access channel occasions in accordance with the first mapping is less than a second maximum duration between any SSB of the second set of SSBs and a corresponding random access channel occasion of the second set of random access channel occasions in accordance with the second mapping.

7. The UE of claim 2, wherein, to receive the control signaling, the one or more processors are individually or collectively operable to execute the code to cause the UE to:

receive the control signaling via a radio resource control message while in a radio resource control connected mode with the network entity.

8. The UE of claim 2, wherein, to receive the control signaling, the one or more processors are individually or collectively operable to execute the code to cause the UE to:

receive the control signaling via system information.

9. The UE of claim 1, wherein the one or more processors are individually or collectively further operable to execute the code to cause the UE to:

receive, from the network entity in response to the request, control signaling indicating the random access channel occasion corresponding to the on-demand SSB.

10. The UE of claim 9, wherein the one or more processors are individually or collectively further operable to execute the code to cause the UE to:

receive, with the control signaling, an indication of a set of preambles associated with the random access channel occasion, wherein transmitting the message comprises transmitting one of the set of preambles.

11. The UE of claim 9, wherein, to receive the control signaling, the one or more processors are individually or collectively operable to execute the code to cause the UE to:

receive a downlink control information via a downlink control channel monitoring occasion associated with the on-demand SSB.

12. The UE of claim 9, wherein the one or more processors are individually or collectively further operable to execute the code to cause the UE to:

receive a downlink control information via a downlink control channel monitoring occasion associated with scheduling a downlink shared channel transmission from the network entity.

13. The UE of claim 1, wherein, to transmit the request, the one or more processors are individually or collectively operable to execute the code to cause the UE to:

transmit an uplink wake-up signal to the network entity.

14. A network entity, comprising:

one or more memories storing processor-executable code; and one or more processors coupled with the one or more memories and individually or collectively operable to execute the code to cause the network entity to:

receive, from a user equipment (UE), a request for an on-demand synchronization signal block (SSB);

transmit, to the UE and in response to the request, the on-demand SSB, wherein each on-demand SSB of a first set of on-demand SSBs corresponds to a respective random access channel occasion of a first set of random access channel occasions and the first set of on-demand SSBs comprises the on-demand SSB; and monitor for a message from the UE in a random access channel occasion of the first set of random access channel occasions, based at least in part on the random access channel occasion corresponding to the on-demand SSB.

15. The network entity of claim 14, wherein the one or more processors are individually or collectively further operable to execute the code to cause the network entity to:

transmit, to the UE, control signaling indicating a first mapping between the first set of on-demand SSBs and first set of random access channel occasions, wherein each on-demand SSB of the first set of on-demand SSBs corresponds to the respective random access channel occasion of the first set of random access channel occasions in accordance with the first mapping.

16. The network entity of claim 15, wherein the one or more processors are individually or collectively further operable to execute the code to cause the network entity to:

selectively refrain from monitoring for a second message from the UE in a second random access channel occasion of the first set of random access channel occasions corresponding to a second SSB of the first set of on-demand SSBs based at least in part on refraining from transmitting the second SSB, wherein the first mapping indicates that the second random access channel occasion corresponds to the second SSB.

17. The network entity of claim 15, wherein the one or more processors are individually or collectively further operable to execute the code to cause the network entity to:

selectively monitor for a second message in a second random access channel occasion of the first set of random access channel occasions corresponding to a second SSB of the first set of on-demand SSBs that was not transmitted based at least in part on the control signaling indicating that the first set of on-demand SSBs on-demand SSBs, wherein the first mapping indicates that the second random access channel occasion corresponds to the second SSB.

18. The network entity of claim 15, wherein the one or more processors are individually or collectively further operable to execute the code to cause the network entity to:

transmit, with the control signaling, an indication of a second mapping between a second set of SSBs and a second set of random access channel occasions, wherein the control signaling indicates that the first set of on-demand SSBs are on-demand SSBs, and wherein the control signaling indicates that the second set of SSBs are un-solicited.

19. The network entity of claim 18, wherein a first maximum duration between any SSB of the first set of on-demand SSBs and a corresponding random access channel occasion of the first set of random access channel occasions in accordance with the first mapping is less than a second maximum duration between any SSB of the second set of SSBs and a corresponding random access channel occasion of the second set of random access channel occasions in accordance with the second mapping.

20. The network entity of claim 15, wherein, to transmit the control signaling, the one or more processors are individually or collectively operable to execute the code to cause the network entity to:

transmit the control signaling via a radio resource control message while in a radio resource control connected mode with the network entity.

21. The network entity of claim 15, wherein, to transmit the control signaling, the one or more processors are individually or collectively operable to execute the code to cause the network entity to:

transmit the control signaling via system information.

22. The network entity of claim 14, wherein the one or more processors are individually or collectively further operable to execute the code to cause the network entity to:

transmit, to the UE in response to the request, control signaling indicating the random access channel occasion corresponding to the SSB.

23. The network entity of claim 22, wherein the one or more processors are individually or collectively further operable to execute the code to cause the network entity to:

transmit, with the control signaling, an indication of a set of preambles associated with the random access channel occasion, wherein receiving the message comprises receiving one of the set of preambles.

24. The network entity of claim 22, wherein, to transmit the control signaling, the one or more processors are individually or collectively operable to execute the code to cause the network entity to:

transmit a downlink control information via a downlink control channel monitoring occasion associated with the on-demand SSB.

25. The network entity of claim 22, wherein, to transmit the control signaling, the one or more processors are individually or collectively operable to execute the code to cause the network entity to:

transmit a downlink control information via a downlink control channel monitoring occasion associated with scheduling a downlink shared channel transmission.

26. The network entity of claim 14, wherein, to receive the request, the one or more processors are individually or collectively operable to execute the code to cause the network entity to:

receive an uplink wake-up signal from the UE.

27. A method for wireless communications at a user equipment (UE), comprising:

transmitting, to a network entity, a request for an on-demand synchronization signal block (SSB);

receiving, from the network entity and in response to the request, the on-demand SSB, wherein each on-demand SSB of a first set of on-demand SSBs corresponds to a respective random access channel occasion of a first set of random access channel occasions and the first set of on-demand SSBs comprises the on-demand SSB; and transmitting, to the network entity and, a message in a random access channel occasion of the first set of random access channel occasions, based at least in part on the random access channel occasion corresponding to the on-demand SSB.

28. The method of claim 27, further comprising:

receiving, from the network entity, control signaling indicating a first mapping between the first set of on-demand SSBs and the first set of random access channel occasions wherein each on-demand SSB of the first set of on-demand SSBs corresponds to the respective random access channel occasion of the first set of random access channel occasions in accordance with the first mapping.

29. The method of claim 28, further comprising:

selectively refraining from transmitting a second message in a second random access channel occasion of the first set of random access channel occasions corresponding to a second SSB of the first set of on-demand SSBs based at least in part on a determination that the second SSB was not received, wherein the first mapping indicates that the second random access channel occasion corresponds to the second SSB.

30. A method for wireless communications at a network entity, comprising:

receiving, from a user equipment (UE), a request for an on-demand synchronization signal block (SSB);

transmitting, to the UE and in response to the request, the on-demand SSB, wherein each on-demand SSB of a first set of on-demand SSBs corresponds to a respective random access channel occasion of a first set of random access channel occasions and the first set of on-demand SSBs comprises the on-demand SSB; and monitoring for a message from the UE in a random access channel occasion of the first set of random access channel occasions, based at least in part on the random access channel occasion corresponding to the on-demand SSB.

* * * * *